United States Patent [19]

Faessinger

[11] 3,864,296

[45] Feb. 4, 1975

[54] AQUEOUS PRINTING FLUIDS FOR PAPER
[75] Inventor: Robert W. Faessinger, Media, Pa.
[73] Assignee: Scott Paper Company, Philadelphia, Pa.
[22] Filed: Feb. 28, 1967
[21] Appl. No.: 619,210

Related U.S. Application Data
[63] Continuation-in-part of Ser. Nos. 424,221, Jan. 8, 1965, abandoned, and Ser. No. 424,223, Jan. 8, 1965, abandoned, and Ser. No. 424,224, Jan. 8, 1965, abandoned, and Ser. No. 424,225, Jan. 8, 1965, abandoned.

[52] U.S. Cl............................ 260/29.2 N, 8/7, 8/82, 8/85, 117/15, 117/38, 117/155, 260/29.4 R, 260/70, 260/72 R, 260/72 N, 260/28 SC, 260/39 P
[51] Int. Cl...................... C08g 51/24, C08g 51/66
[58] Field of Search.................. 260/29.2, 29.4, 70; 106/20, 22; 117/15, 38; 8/7, 18, 76, 82, 85; 162/126, 134, 162, 166, 167

[56] References Cited
UNITED STATES PATENTS

| | | | |
|---|---|---|---|
| 2,556,902 | 6/1951 | Chambers et al.................. | 260/29.4 |
| 2,730,446 | 1/1956 | Hutchins.............................. | 162/162 |
| 2,769,799 | 11/1956 | Suen et al.......................... | 260/29.4 |
| 2,926,154 | 2/1960 | Keim................................... | 260/29.2 |
| 3,128,222 | 4/1964 | Herschler et al. ................. | 162/162 |
| 3,275,605 | 9/1966 | Eastes et al........................... | 260/70 |

FOREIGN PATENTS OR APPLICATIONS
912,902  12/1962  Great Britain

Primary Examiner—John C. Bleutge
Attorney, Agent, or Firm—Bacon & Thomas

[57] ABSTRACT

Aqueous, low-viscosity, printing fluids containing a water-soluble, cationic, thermosetting resin and a water-soluble dye which is compatible with the resin in solution. These printing fluids are useful in high speed printing processes.

33 Claims, No Drawings

AQUEOUS PRINTING FLUIDS FOR PAPER

CROSS REFERENCES TO RELATED APPLICATIONS

This application is a continuation-in-part of copending applications Ser. Nos. 424,221; 4244,223; 424,224 and 424,225, all of which were filed on Jan. 8, 1965; and is closely related to copending applications Ser. Nos. 424,220; 424,222; 424,226 and 424,248, all of which were also filed on Jan. 8, 1965 all now abandoned.

BACKGROUND OF THE INVENTION

1. Field of the Invention

This invention pertains to novel printing fluids; more particularly, this invention relates to certain aqueous printing fluids which are mixtures of self-curing, water-soluble, cationic thermosetting resins and particular water-soluble dyes suitable for printing unsized webs at high printing velocities, for example, up to about 5,000 ft./min. and over. The printed products obtained by printing with these novel printing fluids are also within the purview of this invention.

2. Description of the Prior Art

In most of prior-art rotogravure processes pigmented printing fluids containing high vapor pressure solvents as carrier fluids have been used. These fluids contain dispersed particulate matter of great hiding power. Particles dispersed within these fluids give the tinctorial strength needed for printing when these fluids are deposited on the surface of the printed web and the solvent removed thereafter.

While the final print quality of these fluids is often excellent, the process possesses inherent limitations such as the velocity at which the web may be printed, as well as the rate of solvent removal from the pigmented fluids. Needless to say, the many dangers inherent in using high-vapor pressure solvents are considerable. Also, eliminating such a drying step if comparable or better economic results can be obtained is obviously a desideratum.

Other prior-art shortcomings, in comparison with this process, are the life span of the rotogravure roll or intaglio surface because the pigmented particulate materials abrade the roll surface in places of contact with another surface such as the printing nip, and doctor blades.

Still other shortcomings found in prior art rotogravure printing are the higher viscosities of printing fluids. The viscosity, coupled with the abrasive nature of the fluid, illustrates why rotogravure rolls are short-lived in comparison with this process.

Additionally, the high viscosity of the prior-art fluids prevents the printing process from running at high speeds. For example, at high speeds the tackiness of the prior-art fluids would cause fiber "picking" or removal from the web and also at still higher viscosities this tackiness causes the paper to wrap itself around the printing surface. This phenomenon is avoided by reducing the viscosity of the printing fluid by adding solvent.

Therefore, it is obvious that any change in one property of the fluid will significantly alter other properties of the fluid if the nature of the prior art system is significantly changed to obtain improved results.

SUMMARY OF THE INVENTION

It has now been found that a completely new and unobvious approach in printing fluids does overcome most of the prior-art shortcomings and allows the printing operations to be carried out at web velocities up to about 5,000 ft./min. and higher or a web velocity of about a mile per minute at a cost substantially lower than achievable by any prior-art processes. The novel printing fluid suitable for rotogravure printing at web velocities up to about 5,000 ft./min. in its generic sense comprises an aqueous solution of a cationic, thermosetting resin, a dye compatible with said resin, said dye and resin mixture having a stability of from about one hour to in excess of four months and a transference value of from about 0 to about four, and a viscosity at 77°F of less than about 20 cps.

DESCRIPTION OF THE PREFERRED EMBODIMENTS

In the present invention, "cationic" resin means any water soluble, polymeric resin species possessing one or more positive charges, such charges arising by virtue of the presence in the polymer backbone or pendantly attached organic ammonium, sulfonium or phosphonium groups. The cationic nature of such water soluble polymeric resin species not only allows for greater polymer affinity for cellulosic fibers but also provides the electro-static sites necessary for potential salt formation with the dye molecules.

By "thermosetting" property is meant the ability of a resin to become hard, durable and insoluble at room temperature or more rapidly by the application of heat or some other form of energy. This property is usually associated with a cross-linking reaction of the individual resin molecular species to form a three dimensional network of polymer molecules. In the case of this invention, the cross-linking process involves not only the polymeric resin species themselves, but in the presence of a dye having resin-reactive groups the dye molecules become a part of the resultant insoluble three dimensional network.

Solutions of thermosetting resins which are capable of cross-linking to an insoluble, durable state at room temperature upon solvent evaporation are sometimes referred to as "self-curing." However, this curing process can be markedly accelerated by the application of heat and, in sone cases, by the inclusion of an acidic catalyst.

The preferred resin solutions are those which are aqueous and contain a cationic, thermosetting resin of the type previously described which will "self-cure" with and in some cases without the aid of an acidic catalyst to a hard, insoluble, durable state within about four weeks or less at room temperature.

The resin in solution must also exhibit non-dilatant viscosity characteristics. For purposes of this invention, the described condensates are also limited by the viscosity considerations as set out herein.

The dyes which will find use in this invention must be water soluble. In addition, such dyes must be compatible with the resin in solution and must be capable of reacting with the cellulose, with the resin or, preferably, with both during the resin curing process. It is obvious, hence, that the greater the reactivity of the dye molecules the lower will be the transference values of the colored imprint.

The water soluble dyes useful in the novel fluid are generally those with anionic characteristics, i.e., bearing an opposite change to the resin. Although the combination of a cationic resin and an anionic dyestuff is basically incompatible, this difficulty can be overcome by using an amount of resin in excess of the stoichiometric ratio. For example, most water soluble, cationic, thermosetting resins may be made compatible with direct acid and reactive dyes.

This stabilized solution, it is believed, in turn coacts by curing on the fibers in the web and the degree of this reaction is measured by a transference value.

As there are an untold number of dyes and each dye, it has been found, reacts unpredictably vis-a-vis the particular resin, only a certain family of dyes will be operative in this process. However, since the concept of using a particular water soluble thermosetting resin with a particular dye is novel from the stability aspect as well as the transfer value aspect, many dyes are eliminated on the basis of the first ground as well as on the second. The tests designed to delineate the acceptable dyes from those failing in the instant fluids are set out below and fully discussed. Again, it is stressed that not all dyes meet the first two requirements and that predictability is impossible to establish beforehand. Moreover, in order for the dye to be acceptable, it must be used in quantities such as will establish an acceptable print. Again, this property relates to stability as the dye affects the fluid stability if the dye is present in considerable amounts. In other words, for each particular resin-dye combination a direct relationship exists between fluid stability and the ratio of resin non-volatile solids (N.V.S.) to dye, i.e., stability is adversely affected as the resin to dye ratio decreases.

Obviously, the particular resin must be carefully selected, but it is equally important that a proper dye is obtained. This dye may wash out of the resin if it is of less than the proper reactivity. Again, the result will be high transference values giving poor printed products.

Other reasons why the self-curing resin and dye solution must be specifically selected are further discussed herein. In other words, besides the properties demanded because of the above disclosed reasons, additional properties described herein must be possessed by the resins before these qualify for the present purpose.

In order to delineate the class of resins acceptable in the present invention it has been necessary to develop standards which will measure the resin reactivity as well as the coreactivity of resin and dye. As can be well imagined, the present invention falls in an area where lack of prior art standards have resulted in a vacuum of acceptable standards or measure, which will illustrate the present invention in an acceptable fashion. Thus, the present generic fluid concept involves a. a definition of the useful resins b. a definition of a standard with which a useful resin is compared c. a definition of the resin-dye system which will cover the generic concept, and d. a delineation of the physical properties of these fluids as these properties further limit the acceptable resindye system.

For the purpose of the present invention the useful resins are those resins which are cationic, water soluble, and thermosetting; the most useful resins being those resins which are capable of thermosetting at room temperature within at least 4 weeks.

An alternative requirement of the resin is that it may be cured in a shorter time, i.e., it may be cured by application of heat. However, self-curing resins are the preferred kind. In general heat curing should be accomplished at temperatures below 350°F.

Besides the above properties which are necessary to establish whether a useful resin is suitable as a component for printing purposes, other properties are equally necessary for other reasons. Obviously, the additional properties further limit the above class and eliminate some of the resins.

An important limit is the transference value of the resin-dye system. This transference value as further described herein is based on the fact that it represents the coaction of the resin-fiber-dye system. The exact chemical nature of the resin-dye-fiber system is unknown and for this reason this arbitrary standard has been defined to test the resin-dye-fiber coaction in order to determine the acceptable resin-dye solutions. This test embraces the defining of acceptable dyes in proper concentrations in the resin solution in order to obtain acceptable prints.

Finally, the resin-dye solutions must meet certain physical tests before these solutions may be used for printing purposes in the present process as defined herein.

Physical limits necessary to delineate the acceptable fluids are: (1) viscosity, (2) lack of change of viscosity such as due to change in shearing rate, (3) surface tension, and (4) free from particulate contamination and pigmented particles.

For example, in order to obtain a certain transference value with a certain dye an excess amount of resin may have to be used, this amount of resin may in turn be in excess of the viscosity constraint. (conversely, the viscosity constraint may be satisfied with the proper amount of resin but an inordinate amount of dye may have to be used with the particular resin and thus the solution may fail because of the resin-dye coaction, i.e., a chemical reaction.)

An example of suitable resin compositions is disclosed in U.S. application, Ser. No. 318,493, filed Oct. 24, 1963. These resin compositions are prepared by reacting:

a. A compound selected from at least one member of the group consisting of amino-carboxylic acids of the formula

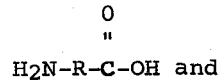

lactams of the formula

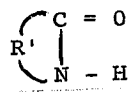

wherein R is a divalent radical selected from the group consisting of saturated and unsaturated carbon atom chains of from 2 to 20 carbon atoms, alicyclic radicals; and aromatic radicals; and R' is an aliphatic chain of from 4 to 18 carbon atoms;

b. A compound selected from at least one member of the group consisting of dibasic acid of the formula

wherein R'' is a divalent radical selected from the group consisting of saturated 1 to 20 carbon atom radicals, unsaturated 2 to 20 carbon atom radicals, alicyclic radicals, aromatic radicals, and the esters and anhydrides of these acids;

c. at least one polyalkylene polyamine compound of the formula $$H_2N\text{-}(R'''NH)_n\text{-}H$$

wherein R''' is an alkylene group of from 2 to 8 atoms and n is an integer of from about 1 to 5, provided that at least 50 percent of the polyamine compound is where n is greater than one: the above (a), (b) and (c) components on mole basis in the reaction mixture being of from about 0.1:1.0:0.9 to about 1.0:1.0:1.3 respectively; the reaction being carried out at a temperature of from about 140°C to about 230°C for a time sufficient to achieve a viscosity of about A to X on Gardner-Holdt scale at about 40 percent solid concentration in the aqueous reaction solution and 25°C; further reacting the obtained condensation product with about 0.8 to about 1.5 moles of a crosslinking agent per mole of reactive amine groups, said crosslinking member being selected from at least one member of the group consisting of 1,3-dichloropropanol, epichlorohydrin, dichloroethylene, dichlorobutene, divinylsulfone, methylene bisacrylamide, diallylamine, glyoxal, crotonaldehyde, divinylether, glycidyladehyde and diglycidylether at a temperature of from about 25°C to about 90°C until the resulting product has a viscosity of about A to T on Gardner-Holdt scale at about 10% solids and at 25°C, and stopping the reaction by adjusting the pH to about 4 to 5.

Another class of resin compositions different in physical and chemical properties from the previous resins but suitable to illustrate in another aspect the novel printing fluid are illustrated in U.S. application, Ser. No. 396,698, filed Sept. 15, 1964.

The resins are prepared by reacting:

a. at least one member of the group consisting of a saturated aliphatic dicarboxylic acid having from 4 to 6 carbon atoms, diglycolic acid and dithioglycolic acid, with b. at least one member of the group consisting of a polyalkylene polyamine of the formula $$H_2N(RNH)_nH$$

where R is an alkylene group of 2 to 4 carbon atoms and n is an integer from 2 to 5, said polyalkylene polyamine and said dicarboxylic acid being reacted in a mole ratio of from about 0.9:1.0 to about 1.15:1.0 in an aqueous medium at a temperature of from about 160° to about 210°C;

c. converting by means of an inorganic acid the polyaminopolyamide reaction product from steps (a) and (b) to an inorganic acid salt thereof;

d. reacting said salt with an alkali cyanate in an aqueous solution to form a polyureide derivative, said cyanate being selected from at least one member of the group consisting of lithium cyanate, sodium cyanate, potassium thiocyanate, said alkali metal cyanate being reacted with said polyaminopolyamide in mole ratios from about 0.8:1.2 moles of the cyanate per mole of reactive amine, at a temperature of from about 50° to about 80°C;

e. reacting the preceding product with an aldehyde selected from at least one member of the class consisting of formaldehyde, paraformaldehyde and trioxane, said aldehyde being present in an amount such that it is equivalent to from 1:1 to about 3:1, at a temperature of from about 60° to about 90°C.

Another class of resins which is useful in this invention is a class of cationic, water soluble, thermosetting resins which are prepared by reacting (a) urea (b) alkylene polyamine (c) formaldehyde and (d) at least one member of the group consisting of thiourea, dicyandiamide, guandine and an amino triazine, said reaction being modified if desired by adding to it after gellation of the reaction mixture a viscosity lowering reacting agent of a certain class and continuing repeatedly to gellation stage said reaction resin. It is understood, though, that the reaction product obtained without the repeated viscosity lowering additive is equally acceptable and useful. In cases where a viscosity lowering additive has been employed, the product is a more desirable species. All the resins obtained by condensation of (a), (b), (c) and (d) are within the purview of this invention, since the viscosity limitation which is placed on the dye-resin mixture as one factor in this invention delineates the acceptable from the unacceptable resins.

In further describing the above resins, these can be classified as modifications of urea, alkylene polyamine and formaldehyde where part of the urea component has been replaced by other amine components such as amino triazines and the reaction is carried out in a specific way if it is desired to obtain a more efficacious product.

As mentioned before, urea is a component in the reaction. Alkylene polyamine is another component and it may be conveniently represented by the formula $H_2N(C_nH_{2n}HN)_xH$ where $x$ is = 1 to 4 and $n$ is 2 or 3. As the partially urea replacing component the following groups of compounds are used: aminotriazines such as melamines (preferred), ammeline, formoguanamine, acetoguanamine, propionoguanamine, 4N-methyl - 2 -acetoguanamine, 4N - ethyl - 2 -acetoguanamines, etc., thioureas, dicyandiamide and guanidine.

The gelation preventing condensation reaction extending viscosity lowering agents are water-soluble, non-ionic aliphatic compounds or mixtures thereof such as formaldehyde, paraformaldehyde, methyl alcohol, ethylalcohol, normal propyl alcohol, ethylalcohol, normal propyl alcohol, isopropyl alcohol, tertiary butyl alcohol, aliphatic polyols, such as ethylene glycol, glyerine, diethylene glycols, triethylene glycols, glucose as well as other non-ionic compounds such as furfuryl alcohol, dimethylsulfoxide, dimethy-formamide, etc.

Preparations of the above resins with and without the viscosity lowering additive may be understood by reference to U.S. Pat. Nos. 2,826,500, 2,856,314, 2,902,472 and 3,223,513. The above patent disclosures are incorporated in the present application to avoid an undue length of this specification.

Another class of resins which is useful in this invention is a class of cationic, water soluble, thermosetting resins which are prepared by reacting (a) dibasic acid (b) alkylene polyamine with or without a glycol (c) epichlorohydrin or diglycidylether and in case of an unsaturated acid, the resins may be further reacted with an ethenoid compound resin.

Dibasic acids or polybasic acids suitable in preparing these resins which are useful in the novel printing fluids of this invention are those described in U.S. Pat. Nos. 3,086,961, 2,926,154 and 2,926,116. These are in general of the formula HOOC—R—COOH and are dibasic acids of from $C_2$ to $C_{16}$ carbon atoms where R can be a saturated aliphatic moiety such as in a diglycolic acid, and aliphatic hydrocarbon moiety such as in adipic acid, alicyclic acids moiety and aromatic moiety. Polybasic aromatic acids and acids where R is an unsaturated aliphatic hydrocarbon moiety are also disclosed in British Pat. No. 917,254. All of the above patent disclosures are incorporated in the present specification to avoid undue duplication of material.

Polyamines of the alkylene polyamine disclosed in U.S. Pat. Nos. 3,086,961, 2,926,154 and 2,926,116 are type represented by the following formula:

$$H_2N(C_mH_2HY)_pC_mNH_2$$

where

$m$ is an integer from 2 to 4

$p$ is an integer from 1 to 4

Alkylene glycols suitable for reacting with the polybasic acid, alkylene polyamide are represented by the following formula:

$$OH(CHOH)_g(C_mH_{2m}O)_gC_mH_{2m}OH$$

where $g$ is an integer of from 0 to 6 and $m$ is an integer from 2 to 4.

These glycols are further described in U.S. Pat. No. 3,086,961.

As a crosslinking agent after either the polybasic acid and alkylene polyamine have been reacted or after the polybasic acid, alkylene polyamine and glycol have been reacted are halohydrins such as epichlorohydrin. Other cross-linking agents are alpha, omega dichloroalkylenes and other similar agents.

If the polybasic acids are unsaturated these may be further reacted with ethenoid compounds such as vinylacetate, esters of acrylic and methacrylic acid, etc. Products of this nature are illustrated in British Pat. No. 917,254.

Another class of resins which is useful in this invention are the cationic ureaformaldehyde resins, prepared with or without following the sequential condensation procedure as described in British Pat. No. 912,902. The resins of this class are obtained by a process of making cationic, amine-modified, urea formaldehyde resins by the acid condensation of a reaction mixture of urea, formaldehyde and at least one polyalkylene polyamine of the formula

$x$ being an integer from 1 to 5 and $n$ being 2 or 3.

If the reaction mixture is susceptible of polymerization to a gell stage, this may be avoided by including a viscosity lowering additive in the reaction mixture to inhibit gelation thereof. These additives are water soluble, non-ionic, aliphatic compounds. As additive is introduced into the reaction mixture at the time of incipient gelation thereof whereupon the condensation reaction can be continued to the point of incipient gelation. This procedure permits continuation of condensation. and production of resins of altered physical and chemical properties, ordinarily prohibited by gelation of the usual reaction mixtures. Thus, in the production of the preferred resins the inclusion of a water-soluble, non-ionic aliphatic compound which is hydroxylated in aqueous solution, such as formaldehyde, methyl alcohol, ethyl alcohol, normal propyl alcohol, isopropyl alcohol, tertiary butyl alcohol, aliphatic polyols, including ethylene glycol, glycerine, diethylene glycol, triethylene glycol, gluscose, and other non-ionic compounds, for example, furfuryl alcohol, in the urea-formaldehyde-polyalkylene polyamine reaction mixture inhibits gelatin thereof or lowers the viscosity of partially gelled reaction mixtures sufficiently so that the condensation reaction and conversion to effective resin may be extended. Depending somewhat upon the amount of additive employed and its application in increments, a repetitive cycle of incipient gelation, reduction in viscosity, incipient gelation, extends the condensation reaction to the point that the ultimate composition product is a preferred wet-strength paper resin.

However, it shall be understood that the urea-formaldehydeamine modified resins are in general prepared by a conventional condensation terminated at a given viscosity, rather than by the sequential gelation-dilution reaction. Therefore, both types of resins within this class are within the purview of this invention.

Still further classes of resins which are useful in preparing printing fluids which are within the generic scope of this invention are those classes of resins which are useful in preparing specific printing fluids disclosed and claimed in the following copending and related applications: U.S. Ser. No. 424,220; U.S. Ser. No. 424,222; and U.S. Ser. No. 424,226; all of which were filed on Jan. 8, 1965. The disclosures of these applications are hereby incorporated in present application by reference thereto.

In order to render the cationic resins acceptable for printing purposes the resins may need to be modified by acidic catalysts compatible with the dye-resin solutions. Generally, the urea-formaldehyde cationic resins, as well as the polyurea type resins, are used in conjunction with the acidic catalyst. Examples of such acid catalysts are acetic acid, lactic acid, glycolic acid, diglycolic acid, citric acid, phosphoric acid, hydrochloric acid, ammonium chloride, etc. Polyamine type resins illustrated above are pH independent and do not require catalysts. However, some pH adjustment might be required with certain dyes for compatibility and stability purposes.

Further, to improve fluid stability, particularly at low resin-to-dye ratios, fluid additives are included; these are exemplified by compounds such as formaldehyde, methyl alcohol, glyoxal, glycols such as ethylene (low molecular-weight polyethylene glycol) and propylene glycol, glycol ethers such as Cellosolve and Carbitol; formamide, dimethylformamide, polyvinyl pyrolidone, tetrahydrofurfuryl alcohol, dimethyl sulfoxide, and the like compounds such as compounds with hydroxy containing moieties or highly polar unreactive compounds, etc.

Urea may also be added to the present fluids for dye solubilizing and formaldehyde scavenging. If problems exist with fluid affinity for gravure rolls, which are generally chrome plated, surface-active agents may be added. Examples of these are non-ionic surface-active agents such as nonylphenoxypoly-(ethylenoxide) and others obtainable from Atlas Chemical Corp. such as the Atmos, Atmul, and Tween series of non-ionics.

This printing fluid, as further amplified herein, is suitable for rotogravure intaglio printing of papers having an absorbency time of up to 600 sec./0.010 ml. of water. The more preferred papers have an absorbency rate as depicted in the following table.

TABLE

ABSORBENT PAPERS

| Type of Paper | Most Preferred | More Preferred | Preferred |
|---|---|---|---|
| Multi-Ply Toilet/Facial Tissues | | | |
| Basis Weight - lb./ream | 9.2 - 10.7 | 7.5 - 11.5 | 5.0 - 15.0 |
| Absorbency - sec./0.10 ml. | 0 - 10 | 0 - 15 | 0 - 180 |
| Single Ply Toilet Tissue | | | |
| Basis Weight - lb./ream | 11.5 - 14.0 | 9.0 - 16.0 | 7.0 - 20.0 |
| Absorbency - sec./0.01 ml. | 0 - 60 | 0 - 120 | 0 - 300 |
| Single Ply - Towel/Wiper | | | |
| Basis Weight - lb./ream | 20.0 - 36.0 | 11.0 - 40.0 | 10.0 - 50.0 |
| Absorbency - sec./0.10 ml. | 0 - 60 | 0 - 360 | 0 - 600 |
| Multi-Ply Towel/Wiper | | | |
| Basis Weight - lb./ream | 9.0 - 20.0 | 8.0 - 21.0 | 5.0 - 25.0 |
| Absorbency - sec./0.10 ml. | 0 - 60 | 0 - 300 | 0 - 600 |
| Single Ply Napkin | | | |
| Basis Weight - lb./ream | 12.0 - 15.5 | 9.0 - 19.0 | 6.0 - 25.0 |
| Absorbency - sec./0.01 ml. | 0 - 100 | 0 - 360 | 0 - 600 |
| Multi-Ply Napkin | | | |
| Basis Weight - lb./ream | 9.7 - 11.2 | 7.0 - 15.0 | 5.0 - 20.0 |
| Absorbency - sec./0.10 ml. | 0 - 300 | 0 - 600 | 0 - 600 |

Basis weight is expressed in pounds per ream (lb./ream). A ream as used herein is 24 inches × 36 inches × 480 sheets or a total of 2,880 square feet.

Absorbency is expressed in seconds as the time required for the paper specimen to absorb a specified volume of distilled water. The area of each specimen (obtained from a retail unit) is to be no less than 9 square inches, cut to 3 inches × 3 inches. The specimen to be tested will be suspended in a suitable frame to provide a flat, undistorted surface with no contact, on either side of the specimen, with any other surface or material. With the specimen thus prepared, the specific volume of water in a single drop will be lowered by appropriately divisioned pipette to the surface of the specimen. Timing begins as the water drop touches the specimen and ends with complete absorption — defined as the instant at which the water on the surface fails to reflect light.

| | |
|---|---|
| For Single Ply Tissue and/or Napkins: | 0.01 ml H₂O |
| For All Others: | 0.10 ml H₂O |

Samples from each case will be from no less than 10% of the retail units contained therein. Each individual test will be the result of three (3) drops/side, reporting the 6-drop coverage as the individual test result. The average of these tests will represent the absorbency.

The tests described above are conducted under atmospheric conditions controlled to 75 ± 2°F and 60 ± 2 percent R.H.

Fluid stability at room temperature (77°F.) is herein defined as the period of time intercurring between the manufacture of a fluid and the appearance of physical-chemical changes that would adversely affect operability. These changes usually take place over a period of time and the limiting factors from the standpoint of fluid utilization are the following:

A ± 25 percent change in fluid viscosity from the original value and a departure from the initial one-phase solution.

Stability is measured on an arbitrary scale defined for most preferred fluids as A, signifying a stability of one month or more, for preferred fluids as B, signifying a stability of 1 week to a month, for useable fluids as C, the stability ranging from 1 hour to 1 week and for unacceptable fluids as 0, the stability being 1 hour or less or complete incompatibility in fluid components.

Fluid stability as herein defined is also indicative of "shelf life" or "storage life." Storage life, as defined by the Packaging Institute in the *Glossary of Packaging Terms*, second ed., Riverside Press, Essex Conn., 1955 is "the period of time during which a packaged product can be stored under specific temperature conditions and remain suitable for use. Sometimes called shelf life."

Even if a proper amount of dye can be dissolved in the solution it may not be acceptable because of the bleeding in water "or transfer value test."

The novel printing fluids can also be cleaned which is hardly possible with the pigmented printing fluids since filtering or centrifugation would remove pigment tinctorial material. This property of the novel fluid gives rise to a recirculating system as, in the case of loosely-bonded absorbent papers, the paper dust and loose fibers must be removed from the fluid in order not to overload the system with particulate materials. Therefore, the need for a low-viscosity aqueous solution is important as these solutions can be easily cleaned or separated from impurities such as by centrifugation. This viscosity criterion is of importance because the impurities are removed by cleaning means such as those based upon differences in specific gravity. Consequently, dust-laden webs as well as loosely bonded webs can be printed by means of these fluids because the fluids are cleanable.

Transference, as previously mentioned, relates to the ability of the printed area to resist water washing or bleeding after the resin has cured to the thermosetting state.

Transference solutions establishing *the standard values* for the different resin dye mixtures and classifying acceptable fluids are given below:

*Transfer* is herein defined as the amount of tinctorial material removed from the original colored area by the addition of distilled water and transferred to either an unprinted area of the same substrate or onto another substrate when physical contact is established.

Transfer rating scale:
0 — No noticeable transfer
1 — Very slight (barely noticeable) transfer
2 — Slight transfer
3 — Moderate transfer
4 — Heavy transfer
5 — Very heavy transfer The transfer rating scale is based on the intensity of the color removed when compared with the intensity of the original colored area.

Transfer rating is by definition 0 as a result of carrying out the following experiment: 2 g. of C.I. Direct Blue 1 dye-stuff (DuPont Pontamine Sky blue 6BX) are dissolved in 50 ml. of distilled water heated to 130°F. and transferred into 50 g. of polyhydroxypolyalkylenepolyurea-formaldehyde condensate (30% N.V.S.), U.S. Pat. No. 2,699,435 (Example 2 thereof, appropriately adjusted for its N.V.S. content) Uformite 700 (Rohm and Haas) with agitation. Subsequently, 3 g. of NH$_4$Cl are added to the dye-resin solution and mixing is continued until the catalyst is completely dissolved. Using a 100 microliter pipet, three-hundredths of one mil. (0.03 ml.) of fluid is placed on a No. 1 Whatman filter paper and dried (cured) for 1 hour in an oven at 230°F. The colored portion of the filter paper is then immersed for 5 seconds in distilled water, the excess water is removed by contacting any absorbent medium, and finally the damp test sample is sandwiched between two two-layer pads of No. 1 Whatman filter paper. A 2-pound weight is placed on the top of the filter pad and remains there for at least 10 hours, after which time the sample is removed and the two filter surfaces in contact with the test sample upon examination exhibit no noticeable transfer.

Transfer rating is by definition 1 as a result of carrying out the following experiment: 2 g. of C.I. Direct Blue 1 dye-stuff (DuPont Pontamine Sky Blue 6 BX) are dissolved in 50 ml. of distilled water heated to 130°F. and transferred into 50 g. of polyhydroxypolyalkylenepolyurea-formaldehyde condensate (30 percent N.V.S.), U.S. Pat. No. 2,699,435, Uformite 700 (Rohm and Haas) with agitation. Subsequently, 3 g. of NH$_4$Cl are aded to the dye-resin solution and mixing is continued until the catalyst is completely dissolved. Using a 100 microliter pipet, three-hundredths of one ml. (0.03 ml.) of fluid is placed on a No. 1 Whatman filter paper and dried (cured) for 10 minutes in an oven at 230°F. The colored portion of the filter paper is then immersed for 5 seconds in distilled water, the excess water is removed by contacting any absorbent medium, and finally the damp test sample is sandwiched between two two-layer pads of No. 1 Whatman filter paper. A two-pound weight is placed on the top of the filter pad and remains there at least 10 hours after which time the sample is removed and the two filter surfaces in contact with the test sample upon examination exhibit a very slight (barely noticeable) transfer.

Transfer rating is by definition 2 as a result of carrying out the following experiment: 2 g. of C.I. Direct Blue 1 dye-stuff (DuPont Pontamine Sky Blue 6 BX) are dissolved in 50 ml. of distilled water heated to 130°F. and transferred into 50 g. of polyhydroxypolyalkylenepolyurea-formaaldehyde condensate (30 percent N.V.S.) U.S. Pat. No. 2,699,435, Uformite 700 (Rohm and Haas) with agitation. Subsequently, 0.5 g. of NH$_4$Cl is added to the dye-resin solution and mixing is continued until the catalyst is completely dissolved. Using a 100 microliter pipet, three-hundredths of 1 ml. (0.03 ml.) of fluid is placed on a No. 1 Whatman filter paper and dried (cured) for 60 minutes in an oven at 230°F. The colored portion of the filter paper is then immersed for 5 seconds in distilled water, the excess water is removed by contacting any absorbent medium, and finally the damp test sample is sandwiched between two two-layer pads of No. 1 Whatman filter paper. A 2 pound weight is placed on the top of the filter pad and remains there for at least 10 hours, after which time the sample is removed and the two filter surfaces in contact with the test sample upon examination exhibit a slight transfer.

Transfer rating is by definition 3 as a result of carrying out of the following experiment: 2 g. of C.I. Direct Blue 1 dyestuff (DuPont Pontamine Sky Blue 6 BX) are dissolved in 50 ml. of distilled water heated to 130°F. and transferred into 50 g. of polyhydroxypolyalkylenepolyurea-formaldehyde condensate (30 percent N.V.S.), U.S. Pat. No. 2,699,435, Uformite 700 (Rohm and Haas) with agitation. Subsequently, 0.5 g. of NH$_4$Cl is added to the dye-resin solution and mixing is continued until the catalyst is completely dissolved. Using a 100 microliter pipet, three-hundredths of 1 ml. (0.03ml) of fluid is placed on a No. 1 Whatman filter paper and dried (cured) for 30 minutes in an oven at 230°F. The colored portion of the filter paper is then immersed for 5 seconds in distilled water, the excess water is removed by contacting any absorbent medium, and finally the damp test sample is sandwiched between two two-layer pads of No. 1 Whatman filter paper. A 2 pound weight is placed on the top of the filter pad and remains there for at least 10 hours, after which time the sample is removed and the two filter surfaces in contact with the test sample upon examination exhibit a moderate transfer.

Transfer rating is by definition 4 as a result of carrying out the following experiment: 2 g. of C.I. Direct Blue 1 dye-stuff (DuPont Pontamine Sky Blue 6 BX) are dissolved in 50 ml. of distilled water heated to 130°F. and transferred into 50 g. of polyhydroxypolyalkylenepolyurea-formaldehyde condensate (30 percent N.V.S.), U.S. Pat. No. 2,699,435, Uformite 700 (Rhom and Haas) with agitation. Subsequently, 0.5 g. NH$_4$Cl is added to the dye-resin solution and mixing is continued until the catalyst is completely dissolved. Using a 100 microliter pipet, three-hundredths of 1 ml. (0.03 ml.) of fluid is placed on a No. 1 Whatman filter paper and dried (cured) for 15 minutes in an oven at 230°F. The colored portion of the filter paper is then immersed for 5 seconds in distilled water, the excess water is removed by contacting any absorbent medium, and finally the damp test sample is sandwiched between two two-layer pads of No. 1 Whatman filter paper. A 2 pound weight is placed on the top of the filter pad and remains there for at least 10 hours, after which time the sample is removed and the two filter surfaces in contact with the test sample upon examination exhibit a heavy transfer.

Transfer rating is by definition 5 as a result of carrying out the following experiment: 2 g. of C.I. Direct Blue 1 dye-stuff (DuPont Pontamine Sky Blue 6 BX)

are dissolved in 50 ml. of distilled water heated to 130°F. and transferred into 50 g. of polyhydroxypolyalkylenepolyurea-formaldehyde condensate (30 percent N.V.S.), U.S. pat. No. 2,699,435, Uformite 700 (Rohm and Haas) with agitation. Subsequently, the dye-resin solution pH is adjusted to 10 by addition of 20 drops of saturated NaOH solution and mixed until the catalyst is completely dissolved. Using a 100 microliter pipet, three-hundredths of 1 ml. (0.03 ml.) of fluid is placed on a No. 1 Whatman filter paper and sample remains uncured (not oven dried). The colored portion of the filter paper is then immersed for 5 seconds in distilled water, the excess water is removed by contacting any absorbent medium, and finally the damp test sample is sandwiched between two two-layer pads of No. 1 Whatman filter paper. A 2 pound weight is placed on the top of the filter pad and remains there for at least 10 hours, after which time the sample is removed and the two filter surfaces in contact with the test sample upon examination exhibit a very heavy transfer.

For the process to be operative at the high-web velocities such as around 5,000 ft./min. the viscosity of the fluid must be kept within certain limits. At lower web velocities the viscosity may be higher such as about 20 cps., but again, a more viscous fluid picks up more fiber and may be harder to filter and for this reason is not desirable. For purposes of this process viscosities below 15 cps are preferred. The more preferred range of viscosity for the fluid is of from about 3 cps to 10 cps while the most preferred range is about 3 cps to about 7 cps at 77°F.

In the instant case procedure for determination of liquid viscosities by the Cannon-Fenske Routine Viscometer was used. Equipment needed for viscosity determination includes a constant-temperature bath with thermometer, heating and cooling coils, thermostat, stirrer, a timer and the proper size Cannon-Fenske Routine Viscometer tubes. Size 50 tube is recommended for a range of 0.8 to 3.2 centistokes, size 100 tube for 3 to 12 centistokes, size 150 tube for 7 to 28 centistokes and size 200 tube for 20 to 80 centistokes.

The bath temperature is maintained at 25.0°C ± 0.1°C. The viscosity in centipoises is then calculated by multiplying the centistoke viscosity by the liquid density at 25°C. The liquid density at 25°C is calculated by the following equation: Density of liquid at 25°C = (sp.g. at $t°F$) (dens. water at 60°F)

dens. water at 25°C/dens. water at $t°F$ = (0.00610) (sp. g. at $t°F$)/(dens. water at $t°F$)

The above procedure as employed herein is discussed by M. R. Cannon and M. R. Fenske in Ind. Eng. Chem., Anal., Ed., 10, 297 (1938).

In another aspect the present fluid differs from those of prior art, namely, surface tension. While most of the prior art fluids are designed with low surface tension characteristics to allow the wetting of the roll by the viscous fluid, presently defined fluids are operable at high-surface tension values because low viscosity fluid wets the intaglio surface at acceptable rates. Depending on the degree of surface wetting the surface tension may be varied by adding minor amounts of wetting agents to give the best results. The preferred values are below 50 dynes/cm and below the surface value of pure water (72 dynes/cm). An acceptable range is of from about 30 dynes/cm to about 60 dynes/cm. The surface tension is measured by means of Cenco-duNouy tensiometer.

In comparing the print obtained by means of the prior art pigmented rotogravure inks with the print obtained by the novel fluid the following differences exist. The prior art inks are opaque, i.e., they have considerable hiding power (impervious to the rays of light). On the other hand, the present dyes are transparent although these may be colored. The color value adjustment in prior art is obtained by adding white pigment and coloring. In the present fluids it is performed by preparing a different fluid with a different dye concentration. In practicing this invention, the white pigment is not needed and its place is taken by the color of the substrate, i.e., the color of fibers which are for the most part white for bleached pulp. Consequently a component previously required in a rotogravure ink is now eliminated. Of course, the printing of colored base sheets necessitates the use of colors that, upon becoming deposited on the base sheets, will give the needed color, e.g., a blue base sheet must be printed with yellow dye-resin solution to obtain a green color.

Besides the above factors which contribute to the acceptance of the present fluids, the cost factor is an equally important consideration herein. For example, the cost as well as the necessity of grinding of pigment is eliminated because no pigment is used in this process. Reproducibility of color is extremely good because of standardized dyes and standardized colors. Uniformity of fluid concentration is easily maintained even during very long runs as no large amounts of volatile solvents are used which require constant adjustment. Needless to say, these advantages render the present fluid much less costly and especially suitable for modern high speed mass production methods.

The following examples will serve further to illustrate the invention:

Example 1

50 parts by weight of $CH_2O$ 37 percent solution were added to 50 parts water and 1.072 parts by weight of the acid dye Acid Blue 45, Erio Fast Cyanine S conc. Geigy, and 0.428 parts by weight of the direct dye C.I. Direct Blue 86, Hilton Davis Turquoise, were dissolved in the above solution with agitation and heating to approximately 140°F. The resulting solution was added slowly, with agitation to a second vessel containing 100 parts by weight of (N.V.S. - 31.8 percent), a melamine modified, cationic amine urea-formaldehyde resin of the type described in U.S. Pat. Nos. 2,826,500, 2,856,314, 2,902,472 and 3,223,513. The resulting solution was agitated for 15 minutes.

The fluid had the following properties: pH - 6.7, N.V.S. - 21.5 percent, specific gravity - 1.086, viscosity - 6.4 cps at 77°F, surface tension - 41.8 dynes/cm., stability - better than 2 months.

The fluid was printed with a 19 inch wide commercial type rotogravure printing unit at speeds up to 3,000 fpm on soft, absorbent, 2-ply crepe tissue, i.e., facial tissue. The paper had an attractive blue design imprinted thereon, and had a color transfer rating of 0 after 4 weeks of aging at room temperature.

Example 2

50 parts by weight of 37 percent $CH_2O$ solution were added to 50 parts water and 1.818 parts by weight of the reactive dye Drimarine Scarlet ZGL, C.I. Reactive Red 19, Sandoz, and 0.182 parts by weight of the reactive dye Drimarine Red Z-2B, C.I. Reactive Red 17, Sandoz, were dissolved in the above solution with agitation and heating to approximately 140°F. The resulting solution was added slowly, with agitation to a second vessel containing 100 parts by weight of melamine modified resin described in Example 1 (N.V.S. =31.8 percent). The resulting solution was agitated for 15 minutes.

The fluid had the following properties: pH- 6.9, N.V.S.-26.2 percent, specific gravity - 1.114, viscosity - 17.2 cps, surface tension - 53.3 dynes/cm., stability - better than 2 months.

The fluid was printed with a 19 inch wide commercial type rotogravure printing unit at speeds up to 3,000 fpm on soft, absorbent 2-ply dry crepe tissue, i.e., facial tissue. The paper had an attractive red design imprinted thereon, and had a color transfer rating of 0 after 4 weeks of aging at room temperature.

Example 3

50 parts by weight of $CH_2O$ 37 percent solution were added to 50 parts water and 2.52 parts by weight of the reactive dye Cibacron Brilliant Blue BR, C.I. Reactive Blue 5, Ciba, and 0.48 parts by weight of the reactive dye Cibacron Turquoise Blue G, C.I. Reactive Blue 7, Ciba, were dissolved in the above solution with agitation and heating to approximately 140°F. The resulting solution was added slowly with agitation to a second vessel containing 100 parts by weight (N.V.S. = 31.8 percent) of the resin as described in Example 1.

The fluid had the following properties: pH -6.8, N.V.S. 18.9 percent, specific gravity - 1.088, viscosity - 7.50 cps, surface tension 44.5, stability - 2 months.

The fluid was printed with a 19 inch wide commercial type rotogravure printing unit at speeds up to 3,000 fpm on soft, absorbent, 2-ply dry crepe tissue, i.e., facial tissue. The paper had an attractive blue design imprinted thereon and had a color transfer rating of 0 after 4 weeks of aging at room temperature.

Example 4

50 parts by weight of 37 percent $CH_2O$ were added to 50 parts water and 3.92 parts by weight of the acid dye C.I. Acid Blue 127, Lanasyn Brilliant Blue GL, Sandoz, and 0.04 parts by weight of the direct dye C.I. Direct Black 38, Pontamine Black ETP, DuPont, and 0.04 parts by weight of the direct dye C.I. Direct Violet 9, Erie Brilliant Violet 200 percent were dissolved in the above solution with agitation and heating to approximately 140°F. The resulting solution was added slowly with agitation to a second vessel containing 100 parts by weight (N.V.S. = 31.8 percent) of the resin described in Example 1.

The fluid had the following properties: pH - 6.6, N.V.S. - 18.5 percent, specific gravity - 1.090, viscosity - 6.55 cps, surface tension - 35.4 dynes/cm., stability - better than 2 months.

The fluid was printed with a 19 inch wide commercial type rotogravure printing unit at speeds up to 3,000 fpm on soft, absorbent, 2-ply dry crepe tissue, i.e., facial tissue. The fluid was also printed with a 15 inch wide laboratory rotogravure printing unit at speeds up to 240 fpm on soft, absorbent, 2-ply dry crepe tissue, i.e., facial tissue. The papers had attractive blue design imprinted thereon, which prints had color transfer ratings of 0 after 4 weeks of aging.

Example 5

50 parts by weight of $CH_2O$ (37 percent solution) were added to 50 parts water. 4 parts by weight of the direct dye Pontamine Brilliant Green GX, which consists of 86 percent C.I. Direct Yellow 44 and 14 percent C.I. Direct Blue 1, DuPont, were dissolved in the above solution with agitation and heating to approximately 140°F. The resulting solution was added slowly, with agitation to a second vessel containing 100 parts by weight (N.V.S. = 31.8 percent) of the resin previously described in Example 1.

The fluid had the following properties: pH - 7.0, N.V.S.-17.1 percent, specific gravity - 1.088, viscosity- 6.04 cps, surface tension - 51.0 dynes/cm., stability - 2 months.

The fluid was printed with a 19 inch wide commercial type rotogravure printing unit at speeds up to 3,000 fpm on soft, absorbent, 2-ply dry crepe tissue, i.e., facial tissue. The paper had an attractive green design imprinted thereon, which print had a color transfer rating of 1 after 4 weeks of aging.

Example 6

50 parts by weight of 37 percent $CH_2O$ were added to 50 parts water and 0.332 parts by weight of the direct dye, C.I. Direct Yellow 50, Pontamine Fast Yellow RL, DuPont, and 0.668 parts by weight of the direct dye C.I. Direct Brown 95, Pontamine Fast Brown NP, DuPont, were dissolved in the above solution with agitation and heating to approximately 140°F. The resulting solution was added slowly with agitation to a second vessel containing 100 parts by weight (N.V.S. = 31.8 percent) of the resin described in Example 1.

The fluid had the following properties: pH-7.0, N.V.S.-22.0 percent, specific gravity - 1.096, viscosity - 9.73 cps, surface tension - 51.6 dynes/cm., stability - more than 47 days.

The fluid was printed with a 19 inch wide commercial type rotogravure printing unit at speeds up to 3,000 fpm on soft, absorbent, 2-ply dry crepe tissue, i.e., facial tissue. The paper had an attractive yellow design imprinted thereon, which print had a color transfer rating of 2 after 4 weeks of aging.

Example 7

60 parts by weight of glyoxol (30 percent solution) were added to 40 parts water. 3.33 parts by weight of the reactive dye Cibacron Brilliant Blue BR and 0.67 parts by weight of the reactive dye Cibacron turquoise Blue G-E, C.I. Reactive Blue 7, were dissolved in the above solution with agitation and heating to approximately 140°F. The resulting solution was added slowly, with agitation, to a second vessel containing 100 parts by weight (N.V.S. 32.0 percent) of the resin previously described in Example 1. The solution was aged for 23 days before use.

The fluid had the following properties: pH - 5.9, N.V.S. 30.1 percent, specific gravity - 1.146, viscosity - 7.4 cps after 23 days of aging, surface tension - 43.5 dynes/cm., stability - 3 months.

The fluid was printed with a 19 inch wide commercial type rotogravure printing unit at speeds up to 3,000 fpm on soft, absorbent, 2-ply dry crepe tissue, i.e., facial tissue. The paper had an attractive blue design imprinted thereon, which print had a color transfer rating of 3 after 4 weeks of aging.

Example 8

50 parts by weight of 37 percent $CH_2O$ were added to 50 parts water. 1.6 parts by weight of the reactive dye Drimarine Scarlet ZGL, C.I. Reactive Red 19, Sandoz, and 0.32 parts by weight of the reactive dye Drimarine Red Z-2B, C.I. Reactive Red 17, Sandoz, 0.08 parts by weight of the reactive dye Cibacron Turquoise Blue G-E, Ciba, were dissolved in the above solution with agitation and heating to approximately 140°F. The resulting solution was added slowly, with agitation, to a second vessel containing 100 parts by weight (N.V.S. 32.8 percent) of the resin previously described in Example 1. The resulting solution was agitated for 15 minutes.

The fluid had the following properties: pH-6.6, specific gravity - 1.088, viscosity - 5.74 cps, surface tension - 50.3, stability - better than 2 months.

The fluid was printed with a 15 inch wide laboratory rotogravure printing unit at speeds up to 240 fpm on soft, absorbent, 2-ply dry crepe tissue, i.e., toilet tissue. The paper had an attractive red design imprinted thereon and had a color transfer rating of 0 after 4 weeks of aging.

Example 9

50 parts by weight of $CH_2O$ (37 percent solution) were added to 50 parts water. 5.25 parts by weight of the reactive dye Cibacron Brilliant Yellow 3G, Cibba and 0.75 parts by weight of the reactive dye Cibacron Turquoise Blue G-E, C.I. reactive Blue 7, Ciba, were dissolved in the above solution with agitation and heating to approximately 140°F. The resulting solution was added slowly, with agitation, to a second vessel containing 100 parts by weight of the resin previously described in Example 1. (N.V.S. approximately 32 percent). The resulting solution was agitated for 15 minutes.

The fluid had the following properties: pH-6.8, specific gravity - 1.096, viscosity - 9.65 cps, surface tension 40.9 dynes/cm., stability - 1 month.

The fluid was printed with a 15 inch wide laboratory rotogravure printing unit at speeds up to 240 fpm on soft, absorbent, 2-ply dry crepe tissue, i.e., toilet tissue. The paper had an attractive green design imprinted thereon, which print had a color transfer rating of 0 after 4 weeks of aging.

Example 10

50 parts by weight of 37 percent $CH_2O$ were added to 50 parts water. 1.8 parts by weight of the direct dye C.I. Direct Yellow 50, Pontamine Fast Yellow RL, and 0.882 parts by weight of the reactive dye Drimarine Red Z-2B, C.I. Reactive Red 17, Sandoz and 0.1372 parts by weight of the reactive dye Drimarine Scarlet ZGL, C.I. Reactive Red 19, Sandoz, and 0.206 parts by weight of the reactive dye Cibacron Black RP, C.I. Reactive Black 3, Ciba, were dissolved in the above solution with agitation and heating to approximately 140°F. The resulting solution was added slowly, with agitation, to a second vessel containing 100 parts by weight (N.V.S. approximately 31.8 percent) of the resin previously described in Example 1. The resulting solution was agitated for 15 minutes.

The fluid had the following properties: pH-6.8, specific gravity - 1.088, viscosity - 5.79 cps, surface tension - 55.7 dynes/cm., stability - better than 2 months.

The fluid was printed with a 15 inch wide laboratory rotogravure printing unit at speeds up to 240 fpm on soft, absorbent, 2-ply dry crepe tissue, i.e., toilet tissue. The paper had an attractive yellow design imprinted thereon, which print had a color transfer rating of 0 after 4 weeks of aging at room temperature.

Example 11

50 parts by weight of $CH_2O$ (37 percent solution) were added to 50 parts water. 3 parts by weight of the acid dye C.I. Acid Blue 45, Anthraquinone Blue BN, and 0.8 parts by weight of the reactive dye C.I. Reactive Blue 5, Cibacron Brilliant Blue BR, Ciba, were dissolved in the above solution with agitation and heating to approximately 140°F. The resulting solution was added slowly with agitation to a second vessel containing 100 parts by weight (N.V.S. approximately 32 percent) of the resin previously described in Example 1. The resulting solution was agitated for 15 minutes.

The fluid had the following properties: pH-6.8, specific gravity - 1.090, viscosity - 6.98 cps, surface tension-38.2 dynes/cm., stability - 2 months.

The fluid was printed with a 15 inch wide labortory rotogravure printing unit at speeds up to 240 fpm on soft, absorbent 2-ply dry crepe tissue, i.e., toilet tissue and facial tissue. The papers had attractive blue designs imprinted thereon, which prints had color transfer ratings of 2 after 4 weeks of aging.

Example 12

50 parts by weight of 37 percent $CH_2O$ were added to 100 parts water. 1 part by weight of the reactive dye, C.I. Reactive Blue 5, Cibacron Brilliant Blue BR, and 1 part by weight of the reactive dye, C.I. Reactive BBlue 7, Cibacron Turquoise Blue G, Ciba, were dissolved in the above solution with agitation and heating to approximately 140°F. The resulting solution was added slowly with agitation to a second vessel containing 100 parts by weight (N.V.S. approximately 32.8 percent) of the resin previously described in Example 1. The resulting solution was agitated for 15 minutes.

The fluid had the following properties: pH-6.6, specific gravity - 1.091, viscosity - 6.94 cps, stability - better than 2 months.

The fluid was printed with a 15 inch wide laboratory rotogravure printing unit at speeds up to 240 fpm on soft, absorbent, 2-ply dry crepe tissues, i.e., facial tissue and toilet tissue. The papers had attractive blue designs imprinted thereon, which prints had color transfer ratings of 0 after 4 weeks of aging.

Example 13

50 parts by weight of 37 percent $CH_2O$ were added to 100 parts water. 2 parts by weight of the direct dye Pontamine Brilliant Green GX, which consists of 86 percent C.I. Direct Yellow 44 and 14 percent C.I. Direct Blue 1, DuPont, were dissolved in the above solution with agitation and heating to approximately 140°F. The resuting solution was added slowly with agitation to a second vessel containing 100 parts by weight (approximately N.V.S. = 32 percent) of the resin previously described in Example 1. The resulting solution was agitated for 15 minutes.

The fluid had the following properties: pH - 6.9, stability - 2 months.

The fluid was printed with a 15 inch wide laboratory rotogravure printing unit at speeds up to 240 fpm on soft, absorbent, 2-ply dry crepe tissue, i.e., facial tissue. The paper had an attractive green design imprinted thereon, which print had a color transfer rating of 1 after 4 weeks of aging.

Example 14

50 parts by weight of 37 percent $CH_2O$ were added to 100 parts water. 0.024 parts bby weight of the direct dye C.I. Direct Black 38, Pontamine Black ETP, DuPont, and 0.616 parts by weight of the reactive dye Cibacron Red Brown G. Ciba, and 2.36 parts by weight of the reactive dye Cibacron Yellow R, C.I. Reactive Yellow 3, Ciba, were dissolved in the above solution with agitation and heating to approximately 140°F. The resulting solution was added slowly with agitation to a second vessel containing 100 parts by weight (N.V.S. approximately 31.8 percent) of the resin previously described in Example 1. The resulting solution was agitated for 15 minutes.

The fluid had the following properties: pH-6.85, specific gravity - 1.086, viscosity - 5.85 cps, stability - more than 46 days.

The fluid was printed with a 15 inch wide laboratory rotogravure printing unit at speeds up to 240 fpm on soft, absorbent, 2-ply dry crepe tissue, i.e., facial tissue. The paper had an attractive yellow design imprinted thereon, which print had a color transfer rating of 1 after 4 weeks of aging.

Example 15

50 parts by weight of $CH_2O$ (37 percent solution) were added to 50 parts water. 2 parts by weight of the direct dye C.I. Direct Red 24, Pontamine Fast Scarlet 4 BA, were dissolved in the above solution with agitation and heating to approximately 140°F. The resulting solution was added slowly with agitation to a second vessel containing 100 parts by weight (approximate N.V.S. = 32 percent) of the resin previously described in Example 1. The resulting solution was agitated for 15 minutes.

The fluid had the following properties: pH 6.8, stability - 2 months.

The fluid was printed with a 15 inch wide laboratory rotogravure printing unit at speeds up to 240 fpm on soft, absorbent 2-ply dry crepe tissue, i.e., facial tissue. The paper had an attractive red design imprinted thereon, which print had a color transfer rating of 0 after 4 weeks of aging.

Example 16

20 parts by weight of 37 percent $CH_2O$ and 30 parts by weight of 40 percent glyoxal were added to 50 parts water. 2 parts by weight of the direct dye Pontamine Brilliant Green GR, DuPont, were dissolved in the above solution with agitation and heating to approximately 140°F. The resulting solution was added slowly with agitation to a second vessel containing 100 parts by weight (N.V.S. approximately 32 percent) of the resin previously described in Example 1. The resulting solution was agitated for 15 minutes.

The fluid had the following properties: pH - 6.3, specific gravity - 1.107, viscosity - 6.92 cps, surface tension, 54.5 dynes/cm., stability - more than 44 days.

The fluid was printed with a 15 inch wide laboratory rotogravure printing unit on soft, absorbent, 2-ply dry crepe tissue, i.e., toilet tissue. The paper had an attractive green design imprinted thereon, which print had a color transfer rating of 1 after 4 weeks of aging at room temperature.

Example 17

60 parts by weight of glyoxal (40 percent solution) were added to 40 parts water. 2 parts by weight of the direct dye Pontamine Brilliant Green GX, DuPont, were dissolved in the above solution with agitation and heating to approximately 140°F. The resulting solution was added slowly with agitation to a second vessel containing 100 parts by weight (N.V.S. approximately 32 percent) of the resin previously described in Example 1. The resulting solution was agitated for 15 minutes.

The fluid had the following properties: pH -6.1, specific gravity - 1.136, viscosity - 8.39 cps, surface tension - 56.2, d.p.c., stability 2 months.

The fluid was printed with a 15 inch wide laboratory rotogravure printing unit at speeds up to 240 fpm on soft, absorbent 2-ply dry crepe tissue, i.e., toilet tissue. The paper had an attractive green design imprinted thereon, which print had a color transfer rating of 2 after 4 weeks of aging.

Example 18

2.5 parts by weight of a reactive dye Drimarine Red Z-RL, C.I. Reactive Red 20, Sandoz, were dissolved in 50 parts by weight of ethylene glycol with agitation and heating to 130°F. The resulting solution was added slowly with agitation to 50 parts by weight of the resin previously described in Example 1 and having a non-volatile solids content of approximately 31.8 percent. The resulting solution was agitated for 15 minutes and 3.5 parts by weight of lactic acid 85 percent catalyst were slowly added.

The fluid had the following properties: pH-3.0, viscosity - 6.60 cps, surface tension - 43.7 d.p.c., stability - 1 month.

The fluid was applied by a hand-operated simulated rotogravure method on soft, absorbent, 2-ply dry crepe paper, i.e., facial tissue. The red imprinted area had a transfer rating of 2 after 4 weeks of aging at room temperature (77°F ± 10°F).

Example 19

50 parts by weight of 37 percent $CH_2O$ were added to 50 parts of water in a container equipped with an agitator and means for heating. 1 part by weight of a direct dye, C.I. Direct Red 81, Pontamine Fast Red 8 BLX, was dissolved in the $CH_2O : H_2O$ solution with agitation and heating to 140°F. The resulting solution was added slowly with agitation to 100 parts by weight of the resin previously described in Example 1 and having a non-volatile solids content of approximately 32 percent. The resulting solution was agitated for 15 minutes.

The fluid had the following properties: pH - 5.4, stability - 5 months.

The fluid was applied by a hand-operated simulated rotogravure method on soft, absorbent, 2-ply dry crepe paper, i.e., facial tissue. The red imprinted area had a transfer rating of 1 after 4 weeks of aging at room temperature (77°F ± 10°F).

Example 20

50 parts by weight of 37 percent $CH_2O$ were added to 50 parts of water in a container equipped with an agitator and means for heating. 1.5 parts by weight of an acid dye, C.I. Acid Blue 45, Anthraquinone Blue BN, Geigy, were dissolved in the $CH_2O : H_2O$ solution with agitation and heating to 100°F. The resulting solution was added slowly with agitation to 100 parts by weight of the resin previously described in Example 1 and having a non-volatile solids content of approximately 32 percent. The resulting solution was agitated for 15 minutes.

The fluid had the following properties: pH - 6.5., stability - more tha 45 days.

The fluid was applied by a hand-operated simulated rotogravure method on soft, absorbent, 2-ply dry crepe paper, i.e., facial tissue. The blue imprinted area had a transfer rating of 0 after 4 weeks of aging at room temperature (77°F ± 10°F)

Example 21

50 parts by weight of 37 percent $CH_2O$ were added to 50 parts of water in a container equipped with an agitator and means for heating. 1 part by weight of an acid dye, C.I. Acid Green 3, Pontacyl Green BL, DuPont, was dissolved in the $CH_2O : H_2O$ solution with agitation and heating to 100°F. The resulting solution was added slowly with agitation to 100 parts by weight of the resin previously described in Example 1 and having a non-volatile solids content of approximately 32 percent. The resulting solution was agitated for 15 minutes.

The fluid had the following properties: pH - 3.9, stability - 5 months.

The fluid was applied by a hand-operated simulated rotogravure method on soft, absorbent, 2-ply dry crepe paper, i.e., facial tissue. The green imprinted area had a transfer rating of 4 after 4 weeks of aging at room temperature (77°F ± 10°F).

Example 22

30 parts by weight of Hexylene Glycol were added to 70 parts of water in a container equipped with an agitator and means for heating. 3.148 parts by weight of a reactive dye, Cibacron Yellow R, C.I. Reactive Yellow 3, Ciba and 0.820 parts by weight a reactive dye, Cibacron Red Brown G and 0.032 parts by weight of a direct dye, C.I. Direct Black 38, Pontamine Black ETP, were dissolved in hexylene glycol : $H_2O$ solution with agitation and heating to 140°F. The resulting solution was added slowly with agitation to 100 parts by weight of the resin previously described in Example 1 and having a nonvolatile solids content of approximately 32 percent. The resulting solution was agitated for 15 minutes.

The fluid had the following properties: pH - 6.3., specific gravity - 1.070, viscosity - 12.0 cps, surface tension - 37.1 dynes/cm., stability - more than 40 days.

The fluid was applied by a hand-operated simulated rotogravure method on soft, absorbent, 2-ply dry crepe paper, i.e., facial tissue. The yellow imprinted area had a transfer rating of 2 after 4 weeks of aging at room temperature (77°F ±10°F).

Example 23

40 parts by weight of propylene glycol U.S.P. and 10 parts 37 percent $CH_2O$ were added to 50 parts of water in a container equipped with an agitator and means for heating. 3.148 parts by weight of a reactive dye, Cibacron Yellow R, C.I. Reactive Yellow 3, Ciba, and 0.820 parts by weight of a reactive dye, Cibacron Brown G, Ciba, and 0.32 parts by weight of a direct dye, C.I. Direct Black 38, Pontamine Black ETP, were dissolved in the $CH_2O$ glycol solution with agitation and heating to 140°F. The resulting solution was added slowly with agitation to 100 parts by weight of the resin previously described in Example 1 and having a nonvolatile solids content of approximately 32 percent. The resulting solution was agitated for 15 minutes.

The fluid had the following properties: pH-6.8, specific gravity - 1.092, viscosity - 12.9 cps, stability 1 month.

The fluid was applied by a hand-operated simulated rotogravure method on soft, absorbent 2 - ply dry crepe paper, i.e., facial tissue. The yellow imprinted area had a transfer rating of 1 after 4 weeks of aging at room temperature (77°F ± 10°F).

Example 24

50 parts by weight of 37 percent $CH_2O$ were added to 50 parts of water in a container equipped with an agitator and means for heating. 2 parts by weight of a direct dye, Pontamine Brilliant Green GX, were dissolved in the $CH_2O : H_2O$ solution with agitation and heating to 140°F. The resulting solution was added slowly with agitation to 100 parts by weight of the resin previously described in Example 1 and having a non-volatile solids content of approximately 32 percent. The resulting solution was agitated for 15 minutes.

The fluid had the following properties: pH - 6.8, viscosity - 5.21 cps, stability - more than 1 month.

The fluid was applied by a hand-operated simulated rotogravure method on soft, absorbent, 2-ply dry crepe paper, i.e., facial tissue. The green imprinted area had a transfer rating of 1 after 4 weeks of aging at room temperature (77°F ± 10°F).

Example 25

30 parts by weight of hexylene glycol were added to 70 parts of water in a container equipped with an agitator and means for heating. 4 parts by weight of a direct dye, Pontamine Brilliant Green GX, DuPont, were dissolved in the $H_2O$/glycol solution with agitation and heating to 130°F. The resulting solution was added slowly with agitation to 100 parts by weight of the resin previously described in Example 1 and having a non-volatile solids content of approximately 32 percent. The resulting solution was agitated for 10 minutes.

The fluid had the following properties: pH - 7.0, specific gravity - 1.068, viscosity - 10.6 cps, stability - 2 months.

The fluid was applied by a hand-operated simulated rotogravure method on soft, absorbent, 2-ply dry crepe paper, i.e. facial tissue. The green imprinted area had a transfer rating of 1 after 4 weeks of aging at room temperature (77°F ± 10°F).

Example 26

3.0 parts by weight of the reactive dye, C.I. Reactive Yellow 2, Cibacron Brilliant Yellow 3G, Ciba, and 1 part by weight of the reactive dye C.I. Reactive Blue 7, Cibacron Turquoise blue G, Ciba, were dissolved in 100 parts of water with agitation and heating to approximately 140°F. The resulting solution was added slowly with agitation to a second vessel containing 100 parts by weight of Kymene 709, Hercules Powder Co. (N.V.S. - non-volatile solids - approximately 25 percent), aqueous resin solution of cationic, expoxidized polyamides of polycarboxylic acids. This resin is one of the class of resins of the type set forth in U.S. Pat. No. 2,926,116 and 2,926,154, the variants of which are also described in British Pat. No. 917,254 and U.S. Pat. No. 3,086,961. The resulting solution was agitated for 15 minutes.

The fluid had the following properties: pH - 3.4., N.V.S. - 16.3, specific gravity - 1.053, viscosity - 10.83 cps, surface tension - 43.6, stability - 60 days.

The fluid was printed with a 19 inch wide commercial type rotogravure printing unit at speeds up to 3,000 fpm on soft, absorbent, 2-ply dry crepe tissue, i.e., facial tissue. The paper had an attractive green design imprinted thereon, and had a color transfer rating of 1 after 4 weeks of aging at room temperature.

Example 27

1 part by weight of the direct dye, C.I. Direct 81, Pontamine Fast Red 8 BLX, DuPont, was dissolved in 100 parts of water with agitation and heting to approximately 140°F. The resulting solution was added slowly with agitation to a second vessel containing 100 parts by weight of Kymene 557 resin and falling within the first two descriptions disclosed in the patents in Example 1 (10 percnet N.V.S.). 1 part of the above solution was diluted with 15 parts of water.

The fluid had the following properties: pH - 8.15, viscosity - 1.01 cps, surface tension - 55.7 dynes/cm, stability 3 months.

The fluid was printed at 3,050 fpm on a 15 inch wide laboratory rotogravure printing unit on soft, absorbent, 2-ply dry crepe tissue, i.e., facial tissue. The paper had a pink design imprinted thereon, which print had a color transfer rating of 2 after 4 weeks of aging at room temperature.

Example 28

2 parts by weight of the direct dye, C.I., Direct Yellow 50, Pontamine Fast Yellow R.L., DuPont, was dissolved in 100 parts by weight of water with agitation and heating to approximately 140°F. The resulting solution was added slowly with agitation to a second vessel containing 100 parts by weight of Kymene 557 (10 percent N.V.S.) resin.

The fluid had the following properties: pH - 5.6, viscosity - 2.10 cps, surface tension - 61.5 dynes/cm, stability-3 months.

The fluid was printed at 2,000 fpm on a 15 inch wide laboratory rotogravure printing unit on soft, absorbent, singly-ply wet crepe tissue, i.e., paper towel stock. The paper had a yellow design imprinted thereon, which print had a color transfer rating of 0 after 4 weeks of aging.

Example 29

1 part by weight of the direct dye, C.I. Direct Blue 1, Pontamine Sky Blue 6 BX, was dissolved in 100 parts by weight of water with agitation and heating to approximately 140°F. The resulting solution was added slowly with agitation to a second vessel containing 100 parts by weight of Kymene 557 (10 percent N.V.S.) resin 1 part of the resulting solution was diluted with 1.5 parts of water.

The fluid had the following properties: pH -5.1, stability - 4 weeks.

The fluid was printed at 1,050 fpm on a 15 inch wide laboratory rotogravure printing unit on soft, absorbent, 2-ply dry crepe tissue, i.e., facial tissue. The paper had a blue design imprinted thereon, which print had a color transfer rating of 0 after 4 weeks of aging.

Example 30

1 part by weight of the direct dye, C.I. Direct Violet 47, Pontamine Fast Violet 4RL, DuPont, was dissolved in 100 parts by weight of water with agitation and heating to approximately 140°F. The resulting solution was added slowly with agitation to a second vessel containing 100 parts by weight of Kymene 557 (10 percent N.V.S.) resin. The resulting solution was agitated for 15 minutes.

The fluid had the following properties: pH - 5.2, viscosity - 7.14 cps, stability - better than 2 momths.

The fluid was printed at 2,000 fpm on a 15 inch wide laboratory rotogravure printing unit on soft, absorbent, 2-ply dry crepe tissue, i.e., facial tissue. The paper had an attractive violet design imprinted thereon and had a color transfer rating of 0 after 4 weeks of aging.

Example 31

1 part by weight of the direct dye, C.I. Direct Red 24, Pontamine Fast Scarlet 4BA, DuPont, was dissolved in 100 parts of weight of water with agitation and heating to approximately 140°F. The resulting solution was added slowly with agitation to a second vessel containing 100 parts by weight of Kymene 557 (10 percent N.V.S.) resin. The resulting solution was agitated for 15 minutes.

The fluid had the following properties: pH - 5.2, viscosity - 7.22 cps, stability - better than 2 months.

The fluid was printed at 2,150 fpm on a 15 inch wide laboratory rotogravure printing unit on soft, absorbent, 2-ply dry crepe tissue, i.e., facial tissue, and 1-ply wet crepe tissue, i.e., towel, at 300 fpm. Attractive red designs imprinted thereon had color transfer ratings of 0 after 4 weeks of aging.

Example 32

1.6 parts by weight of the reactive dye, Drimarine Scarlet ZGL, C.I. Reactive Red 19, Sandoz, and 0.32 parts by weight of the reactive dye, Drimarine Red 2B, Sandoz, 0.08 parts by weight of the reactive dye, C.I. Reactive Blue 7, Cibacron Turquoise Blue G-E, C.I. Reactive Blue 7, Ciba, were dissolved in 100 parts by weight of water with agitation and heating to approximately 140°F. The resulting solution was added slowly with agitation to a second vessel containing 100 parts by weight of Kymene 709 (25 percent N.V.S.) resin. The resulting solution was agitated for 15 minutes.

The fluid had the following properties: pH - 3.1, N.V.S. - 13.9 percent, specific gravity - 1.045, viscosity - 14.6 cps, stability - better than 2 months.

The fluid was printed at 240 fpm on a 15 inch wide laboratory rotogravure printing unit on soft, absorbent, 2-ply dry crepe tissue, i.e., facial tissue. The paper had an attractive red design imprinted thereon, which print had a color transfer rating of 0 after 4 weeks of aging.

EXAMPLE 33

4.375 parts by weight of the reactive dye, Reactive yellow 2, Cibacron Brilliant Yellow 3 G, Ciba, and 0.625 parts by weight of the reactive dye, Cibacron Turquoise Blue G-E, Reactive Blue 7, Ciba, were dissolved in 100 parts of water with agitation and heating to approximately 140°F. The resulting solution was added slowly with agitation to a second vessel containing 100 parts by weight of Kymene 709 (25 percent N.V.S.) resin. The resulting solution was agitated for 15 minutes.

The fluid had the following properties: pH-3.2, specific gravity - 1.052, surface tension - 44.9 dpc, stability -1 month.

The fluid was printed at 240 fpm on a 15 inch wide laboratory rotogravure printing unit on soft, absorbent, 2-ply dry crepe tissue, i.e., facial tissue. The paper had an attractive green design imprinted thereon, which print had a color transfer rating of 0 after 4 weeks of aging.

EXAMPLE 34

1.9304 parts by weight of the direct dye, C.I. Direct Yellow 50, Pontamine Fast Yellow RL, DuPont, and 0.0230 parts by weight of the reactive dye, Drimarine Red 2B, C.I. Reactive Red 17, Sandoz, 0.0672 parts by weight of the reactive dye, Drimarine Scarlet ZGL, C.I. Reactive Red 19, Sandoz and 0.0154 parts by weight of the direct dye, C.I. Direct Black 38, Pontamine Black ETP, DuPont, were dissolved in 100 parts by weight of water with agitation and heating to approximately 140°F. The resulting solution was added slowly with agitation to a second vessel containing 100 parts by weight of Kymene 709 (N.V.S. 25 percent) resin. The resulting solution was agitated for 15 minutes.

The fluid had the following properties: pH - 3.5, specific gravity - 1.046, viscosity - 11.1 cps, surface tension - 56.6 dynes/cm, stability - 1 month.

The fluid was printed at speeds up to 240 fpm on a 15 inch wide laboratory rotogravure printing unit on soft, absorbent, 2-ply dry crepe tissue, i.e., toilet tissue. The paper had an attractive yellow design imprinted thereon, and had a color transfer rating of 0 after 4 weeks of aging.

EXAMPLE 35

0.8 parts by weight of the reactive dye, C.I. Reactive Blue 7, Cibacron Turquoise Blue G-E, Ciba, and 3 parts by weight of the acid dye, C.I. Acid Blue 45, Anthraquinone Blue BN, DuPont, were dissolved in 100 parts of water with agitation and heating to approximately 140°F. The resulting solution was added slowly with agitation to a second vessel containing 100 parts by weight of Kymene 709 (25 percent N.V.S.) resin. The resulting solution was agitated for 15 minutes.

The fluid had the following properties: pH - 3.2, specific gravity - 1.050, viscosity - 14.95 cps. stability - 15 days.

The fluid was printed at speeds up to 240 fpm on a 15 inch wide rotogravure printing unit on soft, absorbent, 2-ply dry crepe tissue, i.e., toilet tissue. The paper had an attractive blue design imprinted thereon, which print had a color transfer rating of 1 after 4 weeks of aging.

EXAMPLE 36

1 part by weight of a direct dye, C.I. Direct Red 26, Pontamine Fast Scarlet 8BSN, DuPont, was dissolved in 100 parts of $H_2O$ with agitation and heating to 130°F. The resulting solution was added slowly with agitation to 100 parts by weight of Kymene 557 resin having a nonvolatile solids content of approximately 10 percent. The resulting solution was agitated for 15 minutes.

The fluid had the following properties: pH - 5.5, stability - better than 2 months.

The fluid was applied by a hand-operated simulated rotogravure method on soft, absorbent, 2-ply dry crepe paper, i.e., facial tissue. The red imprinted area had a transfer rating of 0 after 4 weeks of aging at room temperature (77°F ± 10°F).

EXAMPLE 37

1 part by weight of a direct dye, C.I. Direct Red 4, Pontamine Fast Scarlet G, DuPont, was dissolved in 100 parts of water with agitation and heating to 130°F. The resulting solution was added slowly with agitation to 100 parts by weight of Kymene 557 resin having a nonvolatile solids content of approximately 10 percent. The resulting solution was agitated for 15 minutes.

The fluid had the following properties: pH -5.7, stability - 4 months.

The fluid was applied by hand-operated simulated rotogravure method on soft, absorbent, 2-ply dry crepe paper, i.e., facial tissue. The red imprinted area had a transfer rating of 1 after 4 weeks of aging at room temperature (77°F ± 10°F).

EXAMPLE 38

1 part by weight of a direct dye, C.I. Direct Yellow 26, Pontamine Fast Yellow 5 GL, DuPont, was dissolved in 100 parts of water with agitation and heating to 130°F. The resulting solution was added slowly with agitation to 100 parts by weight of Kymene 557 resin having a non-volatile solids content of approximately 10 percent. The resulting solution was agitated for 15 minutes.

The fluid had the following properties: pH - 5.5., stability - 5 months.

The fluid was applied by a hand-operated simulated rotogravure method on soft, absorbent, 2-ply dry crepe paper, i.e., facial tissue. The yellow imprinted area had a transfer rating of 1 after 4 weeks of aging at room temperature (77°F ± 10°F).

EXAMPLE 39

1 part by weight of an acid dye, C.I. Acid Yellow 3, Chinoline Yellow O Conc., Sandoz, was dissolved in 100 parts of water with agitation and heating to 130°F. The resulting solution was added slowly with agitation to 100 parts by weight of Kymene 557 resin having a non-volatile solids content of approximately 10 percent. The resulting solution was agitated for 15 minutes.

The fluid had the following properties: pH - 5.2, stability - better than 2 months.

The fluid was applied by a hand-operated simulated rotogravure method on soft absorbent, 2-ply dry crepe paper, i.e., facial tissue. The yellow imprinted area had a transfer rating of 1 after 4 weeks of aging at room temperature (77°F ± 10°F).

EXAMPLE 40

1 part by weight of a direct dye, C.I. Direct Green 26, Pyrazol Fast Green BL, Sandoz, was dissolved in 100 parts of water with agitation and heating to 130°F. The resulting solution was added slowly with agitation to 100 parts by weight of Kymene 709 resin having a nonvolatile solids content of approximately 25 percent. The resulting solution was agitated for 15 minutes.

The fluid had the following properties: pH - 6.2, stability - 5 months.

The fluid was applied by a hand-operated simulated rotogravure method on soft, absorbent, 2-ply dry crepe paper, i.e., facial tissue. The green imprinted area had

EXAMPLE 41

1 part by weight of an acid dye, C.I. Acid Green 3, Acid Green 2 G conc., Sandoz, was dissolved in 100 parts of water with agitation and heating to 130°F. The resulting solution was added slowly with agitation to 100 parts by weight of Kymene 709 resin having a non-volatile solids content of approximately 25 percent. The resulting solution was agitated for 15 minutes.

The fluid had the following properties: pH-5.4, stability - 3 months.

The fluid was applied by a hand-operated simulated rotogravure method on soft, absorbent, 2-ply dry crepe paper, i.e., facial tissue. The green imprinted area had a transfer rating of 3 after 4 weeks of aging at room temperature (77°F ± 10°F.).

EXAMPLE 42

1 part by weight of an acid dye, C.I. Acid Blue 1, Kiton Pure Blue V Ex. Con., Ciba., was dissolved in 100 parts of water with agitation and heating to 130°F. The resulting solution was added slowly with agitation to 100 parts by weight of Kymene 557 resin having a non-volatile solids content of approximately 10 percent. The resulting solution was agitated for 15 minutes.

The fluid had the following properties: pH - 5.4, stability better than 2 months.

The fluid was applied by a hand-operated simulated rotogravure method on soft, absorbent, 2-ply dry crepe paper, i.e., facial tissue. The blue imprinted area had a transfer rating of 3 after 4 weeks of aging at room temperature (77°F ± 10°F).

EXAMPLE 43

1 part by weight of a reactive dye, Drimarine Navy Z - BGL p.a.f., C.I. Reactive Blue 8, Sandoz, was dissolved in 100 parts of water with agitation and heating to 130°F. The resulting solution was added slowly with agitation to 100 parts by weight of Kymene 709 resin having a non-volatile solids content of approximately 25 percent. The resulting solution was agitated for 15 minutes.

The fluid had the following properties: pH - 3.6, stability - 2 months.

The fluid was applied by a hand-operated simulated rotogravure method on soft, absorbent, 2-ply dry crepe paper, i.e., facial tissue. The blue imprinted area had a transfer rating of 1 after 4 weeks of aging at room temperature (77°F ± 10°F).

EXAMPLE 44

1 part by weight of a direct dye, C.I. Direct Orange 51, Chlorantine Fast Orano LGL, Ciba, was dissolved in 100 parts of water with agitation and heating to 130°F. The resulting solution was added slowly with agitation to 100 parts by weight of Kymene 709 resin having a non-volatile solids content of approximately 25 percent. The resulting solution was agitated for 15 minutes.

The fluid had the following properties: pH - 5.1, stability - 6 months.

The fluid was applied by a hand-operated simulated rotogravure method on soft, absorbent, 2-ply dry crepe paper, i.e., facial tissue. The orange imprinted area had a transfer rating of 0 after 4 weeks of aging at room temperature (77°F ± 10°F).

EXAMPLE 45

1 part by weight of an acid dye, C.I. Acid Orange 10, Kiton Fast Orange G conc., Ciba, was dissolved in 100 parts of water with agitation and heating to 130°F. The resulting solution was added slowly with agitation to 100 parts by weight of Kymene 557 resin having a non-volatile solids content of approximately 10 percent. The resulting solution was agitated for 15 minutes.

The fluid had the following properties: pH-5.4, stability - better than 2 months.

The fluid was applied by a hand-operated simulated rotogravure method on soft, absorbent 2-ply dry crepe paper, i.e., facial tissue. The orange imprinted area had a transfer rating of 1 after 4 weeks of aging at room temperature (77°F ± 10°F).

EXAMPLE 46

1 part by weight of a direct dye, C.I. Direct Violet 47, Pontamine Fast Violet 4RL, DuPont, was dissolved in 100 parts of water with agitation and heating to 130°F. The resulting solution was added slowly with agitation to 100 parts by weight of Kymene 557 resin having a non-volatile solids content of approximately 10 percent. The resulting solution was agitated for 15 minutes.

The fluid had the following properties: pH - 5.0, stability - 9 months.

The fluid was applied by a hand-operated rotogravure method on soft, absorbent 2-ply dry crepe paper, i.e., facial tissue. The violet imprinted area had a transfer rating of 0 after 4 weeks of aging at room temperature (77°F ± 10°F).

EXAMPLE 47

2 parts by weight of a direct dye, C.I. Direct Violet 47, Pontamine Fast Violet 4 RL, are added directly to 100 parts by weight of Kymene 709 resin (25 percent approximate N.V.S.) with agitation and heat to 140°F. The dye-resin is mixed until solution is complete.

The fluid had the following properties: pH -2.8, stability - better than 4 months.

The fluid was applied by a hand-operated simulated rotogravure method on soft, absorbent, 2-ply crepe paper, i.e., facial tissue. The violet imprinted area had a transfer rating of 0 after 4 weeks of aging at room temperature (77°F ± 10°F).

EXAMPLE 48

0.4 parts by weight of a reactive dye, C.I. Reactive Blue 7, Cibacron Turquoise Blue G-E, Ciba, and 1.5 parts by weight of an acid dye, C.I. Acid Blue 45, Anthraquinone Blue BN, DuPont, are added directly to 100 parts by weight of Kymene 709 resin with agitation and heating to 140°F. The dye-resin is mixed until solution is complete.

The fluid had the following properties: pH - 3.1, stability - 3 weeks.

The fluid was applied by a hand-operated simulated rotogravure method on soft, absorbent, 2-ply crepe paper, i.e., facial tissue. The red imprinted area had a transfer rating of 0 after 4 weeks of aging at room temperature (77°F ± 10°F).

EXAMPLE 49

2 parts by weight of a direct dye, C.I. Direct Red 81, Pontamine fast Red8BLX, DuPont, are added directly to 100 parts by weight of Kymene 709 (N.V.S. - 25 percent) with agitation and heat to 140°F. The dye-resin is mixed until solution is complete.

The fluid had the following properties: pH - 3.1, stability - 2 months.

The fluid was applied by a hand-operated simulated rotogravure method on soft, absorbent, 2-ply crepe paper, i.e., facial tissue. The red imprinted area had a transfer rating of 3 after 4 weeks of aging at room temperature (77°F ± 10°F).

Example 50

33 parts by weight of 37 percent $CH_2O$ solution were added to 66 parts by weight of an aqueous, cationic, amine-modified, ureaformaldehyde resin solution of the type described in British Pat. No. 912,902 and Canadian Pat. No. 639,980, having a N.V.S. (Non-volatile solids) of 32 percent (UFC-1156). 0.4 parts by weight of the reactive dye C.I. Reactive Blue 1, Cibacron Turquoise Blue G-E, Ciba, and 1.5 parts by weight of the acid dye, C.I. Acid Blue 45, Anthraquinone Blue BN, DuPont, were dissolved in the above solution with agitation and heating to approximately 140°F. The resulting solution was agitated for 20 minutes and one part of Glacial Acetic Acid catalyst was slowly added. The fluid had the following properties: pH - 5.1, N.V.S. - 27.3 percent, specific gravity 1.122, viscosity - 7.197 cps, stability - more than 3 months.

The fluid was printed with a 19 inch wide commercial type rotogravure printing unit at speeds up to 3,000 fpm on soft, absorbent, 2-ply dry crepe tissue, i.e., facial tissue. The paper had an attractive blue design imprinted thereon, which print had a color transfer rating of 3 after 4 weeks of aging at room temperature.

Example 51

33 parts by weight of 37 percent $CH_2O$ were added to 66 parts by weight of the above described resin having a N.V.S. of 32 percent. 0.8 parts by weight of the reactive dye Drimarine Scarlet 2-GL P.A.F. C.I. reactive Red 19, Sandoz, 0.04 parts by weight of the reactive dye Drimarine Red Z-2B P.A.F. C.I. Reactive Red 17, Sandoz, and 0.16 parts by weight of the reactive dye Cibacron Turquoise Blue G-E, C.I. Reactive Blue 7, Ciba, were dissolved in the above solution with agitation and heating to approximately 140°F. The resulting solution was agitated for 15 minutes and 1 part of Glacial Acetic Acid catalyst was slowly added.

The fluid had the following properties: pH - 4.9, N.V.S. 26 percent, specific gravity - 1.109 at 77°F., viscosity - 6.89 cps at 77°F, surface tension - 51 dynes/cm. at 77°F., stability - better than 3 months.

The fluid was printed with a 19 inch wide commercial type rotogravure printing unit at speeds up to 3,000 fpm on soft, absorbent, 2-ply dry crepe tissue, i.e., facial tissue. The paper had an attractive pink design imprinted thereon, which print had a color transfer rating of 0 after 4 weeks of aging at room temperature.

Example 52

33 parts by weight of 37 percent $CH_2O$ were added to 66 parts by weight of the above described resin having a N.V.S. of 29.5 percent. 0.2 parts by weight of the reactive dye C.I. Reactive Blue1, Cibacron Turquoise Blue G-E, Ciba, 0.75 parts by weight of the acid dye, C.I. Acid Blue 45, Anthraquinone Blue BN, DuPont, were dissolved in the above solution with agitation and heating to approximately 140°F. The resulting solution was agitated for 15 minutes and 1 part of glacial acetic acid catalyst was slowly added.

The fluid had the following properties: pH - 5.1, N.V.S. - 24.9, specific gravity - 1.115, viscosity - 5.66 cps, stability - 3 months.

The fluid was printed with a 19 inch wide commercial type rotogravure printing unit at speeds up to 3,000 fpm on soft, absorbent, 2-ply dry crepe tissue, i.e., facial tissue. The paper had an attractive blue design imprinted thereon, which print had a color transfer rating of 1 after 4 weeks of aging.

Example 53

33 parts by weight of 37 percent $CH_2O$ were added to 66 parts by weight of the above described resin (UFC-1156) having a N.V.S. of 29 percent. 1.75 parts by weight of the reactive dye C.I. Reactive Yellow 2, Cibacron Brilliant Yellow 3G, Ciba, 0.25 parts by weight of the reactive dye C.I. Reactive Blue 7, Cibacron Turquoise Blue G, Ciba, were dissolved in the above solution with agitation and heating to approximately 140°F. The resulting solution was agitated for 15 minutes and 1 part of acetic acid (glacial) catalyst was slowly added.

The fluid had the following properties: pH - 4.9, specific gravity - 1.112, viscosity - 6.61 cps, surface tension- 40 dynes/cm, stability, more than 2 months.

The fluid was printed with a 15 inch wide laboratory rotogravure printing unit at speeds up to 2,000 fpm on soft, absorbent 2-ply, dry crepe tissue, i.e., facial tissue. The paper had an attractive design imprinted thereon, which print had a color transfer rating of 0 after 4 weeks of aging.

Example 54

33 parts by weight of 37 percent $CH_2O$ solution were added to 66 parts by weight of the above described (UFC-1156) having a N.V.S. of approximately 29 percent. 0.75 parts by weight of the acid dye C.I. Acid Blue 45, Anthraquinone Blue BN, DuPont, and 0.2 parts by weight of the reactive dye Cibacron Turquoise blue G-E, Ciba, were dissolved in the above solution with agitation and heating to approximately 140°F. The resulting solution was agitated for 15 minutes and 1 part of glacial acetic acid catalyst was slowly added.

The fluid had the following properties: pH - 4.9, specific gravity - 1.107, viscosity - 5.93 cps, surface tension 39.9 dynes/cm, stability -more than 2 months.

The fluid was printed with a 15 inch wide laboratory rotogravure printing unit at speeds up to 2,000 fpm on soft, absorbent, 2-ply dry crepe tissue, i.e., facial tissue. The paper had an attractive blue design imprinted thereon, which print had a color transfer rating of 1 after 4 weeks of aging.

Example 55

33 parts by weight of 37 percent $CH_2O$ were added to 66 parts by weight of the above described resin (UFC-1156) having a N.V.S. of approximately 29 percent. 0.018 parts by weight of the direct dye C.I. Direct Black 38, DuPontFiber Black UF, and 1.5 parts by weight of the direct dye C.I. Direct Yellow 54, Solantine Yellow 2RLL, National, were dissolved in the above solution with agitation and heating to approximately 140°F. The resulting solution was agitated for 15 minutes and 1 part glacial acetic acid catalyst was slowly added.

The fluid had the following properties: pH - 4.9, specific gravity - 1.113, viscosity - 6.29 cps, surface tension - 41.6 dynes/cm., stability - better than 2 months.

The fluid was printed with a 15 inch wide laboratory rotogravure printing unit at speeds up to 2,000 fpm on soft, absorbent, 2-ply dry crepe tissue, i.e., facial tissue. The paper had an attractive design imprinted thereon, which print had a color transfer rating of 0 after 4 weeks of aging.

Example 56

0.90 parts by weight of a direct dye, C.I. Direct Red 76, solantine Scarlet G (Allied Chemical) and 0.10 parts by weight of a reactive dye Cibacron Yellow 3G, Ciba, were dissolved in 100 parts of water in a container, with agitation and heating to 130°F. The resulting solution was added slowly with agitation to 100 parts by weight of a resin solution prepared by taking 66 parts by weight of the above described resin (UFC-1156), 33 parts by weight of 37 percent $CH_2O$ and 1 part acetic acid glacial. The resulting solution was agitated for 15 minutes.

The fluid had the following properties: pH - 5.4, specific gravity - 1.054, surface tension - 58.7, stability - better than 2 months.

The fluid was printed with a 15 inch wide laboratory rotogravure printing unit at speeds up to 2,000 fpm on soft, absorbent, 2-ply dry crepe paper, i.e., facial tissue. The red imprinted area had a transfer rating of 0 after 4 weeks of aging at room temperature.

Example 57

33 parts by weight of 37 percent $CH_2O$ were added to 66 parts by weight of the resin described in Example 1 (UFC-1156) having a N.V.S. of approximately 29 percent. 3.5 parts by weight of the reactive dye Cibacron Brilliant Yellow 3G, C.I. Reactive Yellow 2, Ciba, 0.5 parts by weight of the reactive dye, C.I. Reactive Blue 7, Cibacron Turquoise Blue G, Ciba, were dissolved in the above solution with agitation and heating to approximately 140°F. The resulting solution was agitated for 15 minutes and 1 part glacial acetic acid catalyst was slowly added.

The fluid had the following properties: pH -4.9, surface tension - 38.9 dynes/cm., stability - better than 2 months.

The fluid was printed with a 15 inch wide laboratory rotogravure printing unit at speeds up to 240 fpm on soft, absorbent, 2-ply dry crepe tissue, i.e., facial tissue. The paper had an attractive green design imprinted thereon, which print had a color transfer rating of 3 after 4 weeks of aging.

Example 58

66 parts by weight of the resin described in Example 1 (UFC-1156), 29.14 percent N.V.S., was modified by addition of 33 parts by weight of 37 percent $CH_2O$ solution, 1 part by weight of acetic acid (glacial). 2 parts by weight of C.I. Direct Red 26, Pontamine Fast Scarlet 8 BSN, were added and mixed with agitation and heating to 140°F. until solution was homogeneous.

The fluid had the following properties: pH - 4.9, stability - better than 2 months.

The fluid was applied by a hand-operated simulated rotogravure method on soft, absorbent, 2-ply crepe paper, i.e., facial tissue. The red imprinted area had a transfer rating of 1 after 4 weeks of aging at room temperature (77°F ± 10°F).

Example 59

66 parts by weight of resin previously described in Example 1 of (UFC-1156) approximately 29 percent N.V.S. was modified by addition of 33 parts by weight of 37 percent $CH_2O$ solution, 1 part by weight of acetic acid glacial. 2 parts by weight of C.I. Direct Blue 15, Pontamine Sky Blue 5 BX, DuPont, were added and mixed with agitation and heating to 140°F until solution was homogeneous.

The fluid had the following properties: pH - 4.9, stability - above 3 months.

The fluid was applied by a hand-operated simulated rotogravure method on soft, absorbent 2-ply crepe paper, i.e., facial tissue. The blue imprinted area had a transfer rating of 1 after 4 weeks of aging at room temperature (77°F ± 10°F).

Example 60

66 parts by weight of resin (UFC-1156), previously described in Example 1, 29 percent N.V.S., was modified by addition of 33 parts by weight of 37 percent $CH_2O$ solution, 1 part by weight of glacial acetic acid. 2 parts by weight of a direct dye, C.I. Direct Brown 95, chlorantine Fast Brown P-BRLL. were added directly to the modified resin solution described above with agitation and heat to 140°F. The fluid was mixed until solution was complete.

The fluid had the following properties: pH - 4.9, stability - better than 2 months.

The fluid was applied by a hand-operated simulated rotogravure method on soft, absorbent, 2-ply crepe paper, i.e., facial tissue. The brown imprinted area had a transfer rating of 0 after 4 weeks of aging at room temperature (77°F ± 10°F).

Example 61

66 parts by weight of resin (UFC-1156), previously described in Example 1 of approximately 29 percent N.V.S., was modified by addition of 33 parts by weight of 37 percent $CH_2O$ solution, 1 part by weight of acetic acid (glacial). 0.83 parts by weight of C.I. Direct Yellow 50, Pontamine Fast Yellow RL, DuPont, and 0.17 parts by weight of C.I. Direct Brown 95, Pontamine Fast Brown NP, DuPont were added and mixed with agitation and heating to 140°F until solution was homogeneous.

The fluid had the following properties: pH - 4.7, stability - 2 months.

The fluid was applied by a hand-operated simulated rotogravure method on soft, absorbent, 2-ply crepe paper, i.e., facial tissue. The golden yellow imprinted area had a transfer rating of 0 after 4 weeks of aging at room temperature (77°F ± 10°F).

Example 62

66 parts by weight of resin (UFC-1156), previously described in Example 1 of approximately 29 percent N.V.S., was modified by addition of 33 parts by weight of 37 percent $CH_2O$ solution, and 1 part by weight of acetic acid (glacial). 1.96 parts by weight of C.I. Acid Blue 127, Lanasyn Brilliant Blue GL, Sandoz, and 0.2 parts by weight of C.I. Direct Violet 9, Allied Chemical, Erie Brilliant Violet B conc. 200 percent and 0.2 parts by weight of Direct Black 38, Pontamine Black ETP, DuPont, were added and mixed with agitation and heating to 140°F until the solution was homogeneous.

The fluid had the following properties: pH - 5.2., stability - more than 2 months.

The fluid was applied by a hand-operated simulated rotogravure method on soft, absorbent, 2-ply crepe paper, i.e., facial tissue. The blue imprinted area had a transfer rating of 1 after 4 weeks of aging at room temperature (77°F ± 10°F).

Example 63

1 part by weight of an acid dye, C.I. Acid Yellow 3, Schinoline Yellow 0 conc., Sandoz, was dissolved in 100 parts of water in a container with agitation and heat to 140°F. The resulting solution was added slowly with agitation to 100 parts by weight of resin solution prepared as follows: 66 parts by weight of resin (UFC-1156), previously described in Example 1, 33 parts by weight of 37 percent $CH_2O$ and 1 part of glacial acetic acid, the solution having 29 percent N.V.S. The resulting solution was agitated for 15 minutes.

The fluid had the following properties: pH - 4.8, stability - better than 2 months.

The fluid was applied by a hand-operated simulated rotogravure methon on soft, absorbent, 2-ply dry crepe paper, i.e., facial tissue. The yellow imprinted area had a transfer rating of 2 after 4 weeks of natural aging at room temperature (77°F ± 10°F).

Example 64

1 part by weight of an acid dye, C.I. Acid Green 3, Acid Green 2 G conc., Sandoz, was dissolved in 100 parts of water in a container with agitation and heat to 140°F. The resulting solution was added slowly with agitation to 100 parts by weight of resin solution prepared as follows: 66 parts by weight of the resin (UFC-1156), described in Example 1, (29 percent N.V.S.), 33 parts of $CH_2O$ (37 percent solution) and 1 part of acetic acid (glacial). The resulting solution was agitated for 15 minutes.

The fluid had the following properties: pH - 4.8, stability - better than 2 months.

The fluid was applied by a hand-operated simulated rotogravure method on soft, absorbent, 2-ply dry crepe paper, i.e., facial tissue. The green imprinted area, had a transfer rating of 2 after 4 weeks of aging at room temperature (77°F ± 10°F).

Example 65

1 part by weight of a direct dye, C.I. Direct Violet 47, DuPont, Pontamine Fast Violet 4RL, was dissolved in 100 parts of water in a container with agitation and heat to 140°F. The resulting solution was added slowly with agitation to 100 parts by weight of resin solution prepared as follows: 66 parts by weight of the resin (UFC-1156), described in Example 1, (29 percent N.V.S.), 33 parts of 37 percent $CH_2O$ and 1 part of glacial acetic acid. The resulting solution was agitated for 15 minutes.

The fluid had the following properties: pH - 4.6, stability - better than 2 months.

The fluid was applied by a hand-operated simulated rotogravure method on soft, absorbent, 2-ply dry crepe paper, i.e., facial tissue. The violet imprinted area had a transfer rating of 0 after 4 weeks of aging at room temperature (77°F ± 10°F).

Example 66

1 part by weight of a reactive dye, Reactive blue 5, Cibacron Brilliant Blue BR, Ciba, was dissolved in 100 parts of water in a container with agitation and heating to 140°F. The resulting solution was added slowly with agitation to 100 parts by weight of a resin solution prepared as follows: 66 parts by weight of the resin (UFC-1156), described in Example 1, (29 percent N.V.S.), 33 parts of $CH_2O$ (37 percent solution) and 1 part acetic acid (glacial). The resulting solution was agitated for 15 minutes.

The fluid had the following properties: pH - 4.5, stability - 1 month.

The fluid was applied by a hand-operated simulated rotoogrovure method on soft, absorbent, 2-ply dry crepe paper, i.e., facial tissue. The blue imprinted area had a transfer rating of 0 after 4 weeks of aging at room temperature (77°F ± 10°F).

Example 67

1 part by weight of a reactive dye, Drimarine Red Z - 2B C.I. Reactive Red 17, Sandoz, was dissolved in 100 parts of water in a container with agitation and heating to 130°F. The resulting solution was added slowly with agitation to 100 parts by weight of a resin solution prepared as follows: 66 parts by weight of the resin (UFC-1156), described in Example 1, (29 percent N.V.S. approximately), 33 parts of $CH_2O$ (37 percent solution) and 1 part acetic acid glacial. The resulting solution was agitated for 15 minutes.

The fluid had the following properties: pH - 4.8, stability - 3 months.

The fluid was applied by a hand-operated simulated rotogravure method on soft, absorbent, 2-ply dry crepe paper, i.e., facial tissue. The red imprinted area had a transfer rating of 0 after 4 weeks of aging at room temperature (77°F ± 10°F).

Example 68

1 part by weight of a direct dye, C.I. Direct Red 81, Pontamine Fast Red 8 BLX, DuPont, was dissolved in 100 parts of water with agitation and heating to 140°F. The resulting solution was added slowly with agitation to 100 parts by weight of a resin solution prepared as follows: 66 parts by weight of the resin (UFC-1156), described in Example 1, (29 percent N.V.S.) 33 parts of $CH_2O$ (37 percent and 1 part of acetic acid glacial. The resulting solution was agitated for 15 minutes.

The fluid had the following properties: pH - 4.7, stability - better than 2 months.

The fluid was applied by a hand-operated simulated rotogravure methon on soft, absorbent, 2-ply dry crepe paper, i.e., facial tissue. The red imprinted area had a transfer rating of 2 after 4 weeks of aging at room temperature (77°F ± 10°F).

Example 69

Twenty grams (0.177 mole) of e-caprolactam and 145 grams (1.0 mole) of adipic acid were dissolved in a mixture of 93 grams (0.9 mole) of diethylene triamine, 20.0 grams (0.136 mole) of triethylene tetramine and 50 grams of water, and the resulting solution was heated in a vessel equipped with a mechanical agitator and condenser until the theoretical amount of water was removed from the condensation product mixture. This mixture was then heated to 195° to 210°C for 3½ hours, after which a vacuum was applied and heating was continued for an additional half hour at 180° to 190°C to insure that the condensation reaction was completed. The resulting product was cooled to about 140°C, and then dissolved in 385 grams of water. The solution had a Gardner viscosity of F at 25°C and had a non-volatile solids content of approximately 39.6 percent.

Ninety-one grams of this solution were added to 263 grams of water, and the resulting solution was heated to 50°C. Sixteen grams of epichlorohydrin were added dropwise, and then the mixture was heated at a temperature of 65° to 70°C until a Gardner viscosity of between D and E was obtained. One hundred and fifty grams of water were added to quench the reaction and the product was cooled to room temperature. This product had a Gardner viscosity of A at 25°C, and contained approximately 10 percent non-volatile solids.

A tenth of a gram of Pontamine Fast Blue 3RL dye was dissolved in 9.9 grams of water, and this aqueous dye solution was then mixed with 10 grams of the final resin product prepared above. The resulting printing fluid was stable for at least 3 days and when employed as a printing fluid for paper web material, resulted in a bleed-fast printed product. The following dyes can also be used in place of Pontamine Fast Blue 3RL to give equivalent results. Pontamine Fast Yellow RL, Pontamine Fast Rubine B, Pontamine Fast Green 2GL, Pontamine Deayo Orange 2R, and Ponsol Direct Black 3GC.

Example 70

100 grams (1.0 mole) of adipic acid, 113 grams (1.09 moles) of diethylene triamine and 50 grams of water were placed in a 3-neck flask equipped with a mechanical stirrer, thermometer and condenser, and the mixture was heated to 185° to 200°C for 1 and three-quarters hours. Heating was then discontinued, and a vacuum was applied until the reaction mixture cooled to 140°C. At this point 215 grams of water were then added. The resulting polyaminopolyamide solution contained approximately 52.3 percent of non-volatile solids.

Sixty-one and six-tenths grams of this solution were added to 16.0 grams of a 37.5 percent solution of hydrochloric acid and 38.4 grams of water; 10 grams of potassium cyanate were then added, and the resulting mixture was heated to 70° to 75°C for 1 hour. Thirty-three grams of a 37 percent formaldehyde solution were added to the mixture, and heating was continued until the reaction mixture became a viscous syrup. At this point, 20 grams of formaldehyde were added and stirring was continued for 5 additional minutes, to insure complete mixing of the formaldehyde into the resin syrup. The resulting solution was neutralized to a pH of 7.0 with 10 percent sodium hydroxide and then diluted with 25 grams of water. The final product contained approximately 29 percent non-volatile solids.

A tenth of a gram of Pontamine Fast Turquoise 8 GLD was dissolved in 9.9 grams of water, and this aqueous dye solution was then mixed with 10 grams of the final resin product prepared above. The resulting printing fluid was stable for at least three days and, when employed as a printing fluid for paper web material, resulted in a bleed-fast printed product. The following dyes can alaso be used in place of Pontamine Fast Turquoise 8 GLD to give equivalent results: Pontamine Bond Yellow CR, Pontamine Fast Rubine B, Pontamine Deayo Green 3G, Pontamine Fast Orange 6RN, Pontamine Brilliant Violet B, and Reactone Grey GL.

What is claimed is:

1. A low-viscosity printing fluid for printing cellulose webs which comprises an aqueous solution of a water-soluble, cationic thermosetting resin and a water-soluble dye compatible with said resin, said dye and resin mixture having a stability of from about 1 hour to in excess of 4 months, a transference value of from about 0 to about 4, and viscosity of less than 20 cps. at 77°F.

2. A low-viscosity printing fluid as claimed in claim 1 wherein the fluid is free from particulate matter and has a viscosity of less than 15 cps. at 77°F, a stability of from about 1 hour to in excess of 4 months, and a transference value of from about 0 to about 4 as measured against standardized solutions of a standardized thermosetting resin and a standard dye.

3. A printing fluid according to claim 1 wherein the resin is capable of thermosetting within at least 4 weeks.

4. A low-viscosity printing fluid as claimed in claim 1, wherein the resin is a resin prepared by reacting (a) polybasic acid (b) an alkylene polyamine and (c) a cross-linking agent.

5. A low-viscosity printing fluid as claimed in claim 1, wherein the resin is a resin obtained by reacting (a) a polybasic acid (b) an alkylene polyamine (c) a glycol and (d) epichlorohydrin.

6. A low-viscosity printing fluid as claimed in claim 4 wherein the resin is obtained by reacting an unsaturated polybasic acid and the resin is further reacted after condensation with an ethenoid compound.

7. A low-viscosity printing fluid as claimed in claim 5 wherein the resin is a resin prepared by reacting (a) at least one polybasic acid of the formula $$HOOC - R - COOH$$

where R is of from 2 to 16 carbon atoms and is selected from the group consisting of saturated aliphatic moieties, unsaturated hydrocarbon moieties, alicyclic moieties, and aromatic moieties; (b) alkylene polyamine of the formula $$H_2N(C_mH_{2m}HY)_pC_mH_{2m}NH_2$$

wherein Y is selected from the group consisting of H and $C_mH_{2m}NH_2$ and wherein $m$ is an integer from 2 to 4 and $p$ is an integer from 1 to 4; (c) an alkylene glycol of the formula $$HO(CHOH)g(C_mH_{2m}O)_uC_mH_{2m}OH$$

wherein $g$ is an integer from 0 to 6 and $m$ is an integer from 2 to 4; and (d) a crosslinking agent selected from the class consisting of halohydrins, diglycidylether and alpha, omega dihaloalkylenes; provided that when in said polybasic acid R is an unsaturated moiety the condensate is further reacted with an ethenoid compound selected from the class counting of vinylacetate and lower alkyl esters of acrylic and methacrylic acids.

8. A low-viscosity printing fluid as claimed in claim 7 wherein the resin is prepared by reacting only components (a), (b) and (d).

9. A low-viscosity printing fluid as claimed in claim 7 wherein the resin is prepared by reacting only components (a), (b) and (d) and said polybasic acid moiety R is an unsaturated moiety.

10. A low-viscosity printing fluid as claimed in claim 8 wherein the polybasic acid is adipic acid, the alkylene polyamine is diethylene tetramine and the crosslinking agent is epichlorohydrin.

11. A low-viscosity printing fluid as claimed in claim 7 wherein the fluid has a stability of from about 1 week up to in excess of 4 months, a transference value of from about 0 to about 2 as measured against a standardized solution of polyhydroxypolyalkylene-polyurea-formaldehyde condensate resin and C.I. Direct Blue 1 dye, and a viscosity in the range of from about 3 cps to about 12 cps, the surface tension of said fluid being of from about 30 to about 60 dynes/cm, said fluid being substantially free from volatile solvents having a vapor pressure of less than water.

12. A fibrous web product having a permanent print thereon which is derived from a fluid as claimed in claim 4.

13. A low-viscosity printing fluid as claimed in claim 1 wherein the resin is a cationic-urea-formaldehyde resin condensate.

14. A low-viscosity printing fluid as claimed in claim 13 wherein the resin is an amine-modified urea-formaldehyde thermosetting resin condensate.

15. A low-viscosity printing fluid as claimed in claim 14 wherein the resin is prepared by the acid condensation of a reaction mixture of urea, formaldehyde and at least one polyalkylene polyamine of the formula H$_2$N (C$_n$H$_{2n}$HN) xH 16. A low-viscosity printing fluid as claimed in claim 13 wherein the resin is prepared by the acid condensation of a reaction mixture of urea, formaldehyde, at least one polyalkylene polyamine of the formula H$_2$N(C$_n$H$_{2n}$HN)$_x$H wherein x is an integer of 1 to 5 and n is 2 or 3, and a viscosity lowering additive selected from the class consisting of formaldehyde, methylalcohol, ethylalcohol, normal propylalcohol, isopropylalcohol, tertiary butylalcohol, ethylene glycol, diethylene glycol, triethylene glycol, glycerine, furfuryl alcohol dimethylformamide, and wherein additional amounts of the viscosity lowering additive are added after each incipient gellation in order to enable the condensation reaction to be continued to the desired degree of condensation.

17. A low-viscosity printing fluid as claimed in claim 15 wherein the fluid has a stability of from about 1 week up to in excess of 4 months, a transference value of from about 0 to about 2 as measured against a standardized solution of a polyhydroxy-polyalkylenepolyurea-formaldehyde condensate thermosetting resin and C.I. Direct Blue 1 dye, and a viscosity in the range of from about 3.0 cps to about 7.0 cps, the surface tension of said fluid being of from about 30 to about 60 dynes/cm, said fluid being substantially free from volatile solvents having a vapor pressure of less than water.

18. A fibrous web product having a permanent print thereon which is derived from a fluid as claimed in claim 14.

19. A low-viscosity printing fluid as claimed in claim 1 wherein the resin is a resin prepared by reacting:
a. A compound selected from at least one member of the group consisting of amino-carboxylic acids of the formula $$H_2N-R-C-OH$$
$$\quad\quad\quad\|$$
$$\quad\quad\quad O$$

and lactams of the formula $$C = O$$
$$R'$$
$$N - H$$

wherein R is a divalent radical selected from the group consisting of saturated and unsaturated carbon atom chains of from 2 to 20 carbon atoms, alicyclic radicals; and aromatic radicals; and R' is an aliphatic chain of from 4 to 18 carbon atoms;

b. A compound selected from at least one member of the group consisting of dibasic acid of the formula

HOOC—R''—COOH wherein R'' is a divalent radical selected from the group consisting of saturated 1 to 20 carbon atom radicals, unsaturated 2 to 20 carbon atom radicals, alicyclic radicals, aromatic radicals, and the esters and anhydrides of these acids;

c. at least one polyalkylene polyamine compound of the formula

H$_2$N—(R''' NH)$_n$—H wherein R''' is an alkylene group of from 2 to 8 atoms and n is an integer of from about 1 to 5, provided that at least 50% of the polyamine compound is where n is greater than 1; the above (a), (b) and (c) components on mole basis in the reaction mixture being of from about 0.1:1.0: 0.9 to about 1.0:1.0:1.3 respectively; the reaction being carried out at a temperature of from about 140° to about 230°C for a time sufficient to achieve a viscosity of about A to X on Gardner-Holdt scale at about 40 percent solid concentration in the aqueous reaction solution and 25°C; further reacting the obtained condensation product with about 0.8 to about 1.5 moles of a crosslinking agent per mole of reactive amine groups, said crosslinking member being selected from at least one member of the group consisting of 1,3- dichloropropanol, epichlorohydrin, dichloroethylene, dichlorobutene, divinylsulfone, methylene bisacrylamide, diallylamine, glyoxal, crotonaldehyde, divinylether, glycidylaldehyde and diglycidylether at a temperature of from about 25° to about 90°C until the resulting product has a viscosity of about A to T on Gardner-Holdt scale at about 10 percent solids and at 25°C, and stopping the reaction by adjusting the pH to about 4 to 5.

20. A low-viscosity printing fluid as claimed in claim 19 wherein the resin is obtained by reacting e-caprolactam, adipic acid, diethylene triamine and triethylene tetramine and epichlorohydrin.

21. A fibrous web product having a permanent print thereon which is derived from a fluid as claimed in claim 19.

22. A low-viscosity printing fluid as claimed in claim 1 wherein the resin is a resin prepared by reacting:
a. at least one member of the group consisting of a saturated aliphatic dicarboxylic acid having from 4 to 6 carbon atoms, diglycolic acid and dithioglycolic acid, with
b. at least one member of the group consisting of a polyalkylene polyamine of the formula $$H_2N(RNH)_nH$$

where R is an alkylene group of 2 to 4 carbon atoms and $n$ is an integer from 2 to 5, said polyalkylene polyamine and said dicarboxylic acid being reacted in a mole ratio of from about 0.9:1.0 to about 1.15:1.0 in an aqueous medium at a temperature of from about 160° to about 210°C;
c. converting by means of an inorganic acid the polyaminopolyamide reaction product from steps (a) and (b) to an inorganic acid salt thereof;
d. reacting said salt with an alkali cyanate in an aqueous solution to form a polyureide derivative, said cyanate being selected from at least one member of the group consisting of lithium cyanate, sodium cyanate, potassium, thiocyanate, said alkali metal cyanate being reacted with said polyaminopolyamide in mole ratios from about 0.8:1.2 moles of the cyanate per mole of reactive amine, at a temperature of from about 50° to about 80°C;
e. reacting the preceding product with an aldehyde selected from at least one member of the class consisting of formaldehyde, paraformaldehyde and trioxane, said aldehyde being present in an amount such that it is equivalent to from 1:1 to about 3:1, at a temperature of from about 60° to about 90°C.

23. A low-viscosity printing fluid as claimed in claim 22, wherein the resin is obtained by reacting adipic acid, diethylene, triamine, hydrochloric acid, potassium cyanate and formaldehyde.

24. A fibrous web product having a permanent print thereon which is derived from a fluid as claimed in claim 22.

25. A paper tissue product having a permanent print thereon which is derived from a fluid as claimed in claim 1.

26. A paper towel product having a permanent print thereon which is derived from a fluid as claimed in claim 1.

27. A low-viscosity printing fluid for the high speed rotogravure intaglio printing of a fibrous web, said printing fluid consisting essentially of an aqueous solution of a water-soluble, cationic thermosetting resin and a water-soluble dye compatible with said resin, said dye and resin mixture having a stability of from about 1 hour to in excess of 4 months, a transference value of from about 0 to about 4, and a viscosity of less than 20 cps. at 77°F.

28. A low-viscosity printing fluid for the rotogravure intaglio printing of an absorbent fibrous web at a velocity up to and in excess of about 5,000 feet per minute, said printing fluid consisting essentially of a non-dilatant, aqueous solution of a water-soluble, cationic thermosetting resin and an anionic, transparent, water-soluble dye compatible with said resin, said solution being free from particulate contamination and pigmented particles, and said dye and resin mixture having a stability of from about 1 hour to in excess of 4 months, a transference value of from about 0 to about 4, a viscosity of less than 20 cps. at 77°F., and a surface tension below that of pure water.

29. A low-viscosity printing fluid as claimed in claim 1, wherein the resin is a resin prepared by reacting (a) urea, (b) alkylene polyamine, (c) formaldehyde and (d) at least one member of the group consisting of thiourea, dicyandiamide, guanidine and amino triazine.

30. A low-viscosity printing fluid according to claim 29, wherein the resin is obtained by reacting urea, formaldehyde, diethylene triamine and melamine.

31. A low-viscosity printing fluid as claimed in claim 1, wherein the resin is a resin prepared by reacting (a) urea, (b) formaldehyde, (c) an alkylene polyamine of the formula $$H_2N(C_mH_{2m}HN)_xH$$

wherein $x$ is an integer of 1 to 4 and $m$ is an integer of 2 to 3, (d) at least one member of the group consisting of thiourea, dicyandiamide, guanadine and aminotriazine, in the presence of at least one compound of the class consisting of paraformaldehyde, methyl alcohol, ethyl alcohol, propyl alcohol, butyl alcohols, ethylene glycol, glycerine, diethylene glycols, triethylene glycols, glucose, fururyl alcohol, dimethyl sulfoxide, and dimethylformamide.

32. A low-viscosity printing fluid as claimed in claim 31, wherein the fluid has a stability of from about 1 week up to in excess of 4 months, a transference value of from about 0 to about 2 as measured against a standardized solution of polyhydroxypolyalkylenepolyurea-formaldehyde condensate resin and C.I. Direct Blue dye having the transference values of from 0 to about 2, and a viscosity in the range of from about 3.0 cps to about 7.0 cps, the surface tension of said fluid being from about 30 to about 60 dynes/cm, said fluid being substantially free from volatile solvents having a vapor pressure less than that of water.

33. A fibrous web product having a permanent print thereon which is derived from a fluid as claimed in claim 29.

* * * * *